(12) United States Patent
Yeh et al.

(10) Patent No.: US 7,269,714 B2
(45) Date of Patent: Sep. 11, 2007

(54) INHIBITING OF A CO-ISSUING INSTRUCTION IN A PROCESSOR HAVING DIFFERENT PIPELINE LENGTHS

(75) Inventors: Tse-Yu Yeh, Milpitas, CA (US); David A. Kruckemyer, Mountain View, CA (US); Robert Rogenmoser, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 516 days.

(21) Appl. No.: 10/066,984

(22) Filed: Feb. 4, 2002

(65) Prior Publication Data

US 2003/0061465 A1   Mar. 27, 2003

Related U.S. Application Data

(60) Provisional application No. 60/324,344, filed on Sep. 24, 2001.

(51) Int. Cl.
*G06F 9/30* (2006.01)
(52) U.S. Cl. .................. 712/215; 712/214
(58) Field of Classification Search ............ 712/201, 712/215, 217, 214
See application file for complete search history.

(56) References Cited

U.S. PATENT DOCUMENTS

| | | | |
|---|---|---|---|
| 5,487,156 A | 1/1996 | Popescu et al. | |
| 5,488,730 A | 1/1996 | Brown, III et al. | |
| 5,497,499 A | 3/1996 | Garg et al. | |
| 5,502,827 A * | 3/1996 | Yoshida | 712/244 |
| 5,546,593 A | 8/1996 | Kimura et al. | |
| 5,559,977 A * | 9/1996 | Avnon et al. | 712/244 |
| 5,625,837 A | 4/1997 | Popescu et al. | |
| 5,630,157 A | 5/1997 | Dwyer, III | |
| 5,655,096 A | 8/1997 | Branigin | |
| 5,666,506 A | 9/1997 | Hesson et al. | |
| 5,673,426 A | 9/1997 | Shen et al. | |
| 5,784,588 A | 7/1998 | Leung | |

(Continued)

FOREIGN PATENT DOCUMENTS

GB   2 339 312 A   1/2000

OTHER PUBLICATIONS

Patterson and Hennessy, "Computer Architecture: A Quantitative Approach," Second Edition, Morgan Kaufmann Publishers, Inc., 1996, pp. 230 & 242-251.*

(Continued)

*Primary Examiner*—Eddie Chan
*Assistant Examiner*—Aimee J Li
(74) *Attorney, Agent, or Firm*—Garlick Harrison & Markison

(57) ABSTRACT

A processor is described which includes a first pipeline, a second pipeline, and a control circuit. The first pipeline includes a first stage at which instruction results are committed to architected state. The first stage is separated from an issue stage of the first pipeline by a first number of stages. The second pipeline includes a second stage at which an exception is reportable, wherein the second stage is separated from the issue stage of the second pipeline by a second number of stages which is greater than the first number. The control circuit is configured to inhibit co-issuance of a first instruction to the first pipeline and a second instruction to the second pipeline if the first instruction is subsequent to the second instruction in program order.

6 Claims, 20 Drawing Sheets

U.S. PATENT DOCUMENTS

| | | | |
|---|---|---|---|
| 5,790,827 | A | 8/1998 | Leung |
| 5,884,057 | A | 3/1999 | Blomgren et al. |
| 5,887,185 | A | 3/1999 | Lynch |
| 5,913,049 | A | 6/1999 | Shiell et al. |
| 5,933,618 | A | 8/1999 | Tran et al. |
| 5,991,884 | A | 11/1999 | Lin et al. |
| 6,076,153 | A | 6/2000 | Grochowski et al. |
| 6,195,744 | B1 | 2/2001 | Favor et al. |
| 6,219,796 | B1 | 4/2001 | Bartley |
| 6,282,663 | B1 | 8/2001 | Khazam |

OTHER PUBLICATIONS

Johnson, Mike. Superscalar Microprocessor Design. Prentice Hall, 1991. p. 18.*

Patterson and Hennessy. Computer Architecture, A Quantitative Approach. Morgan Kauffman Publishing, Inc. 1996. pp. 180-183, 230, 242-251.*

Hennessy, John L. and David A. Patterson. Computer Architecture: A Quantitative Approach. Morgan: 1996. p. 183.*

Patterson and Hennessy, "Computer Architecture: A Quantitative Approach," Morgan Kaufmann Publishers, Inc., 1990, pp. 291-299.

Patterson and Hennessy, "Computer Architecture: A Quantitative Approach," Second Edition, Morgan Kaufmann Publishers, Inc., 1990, 1996, pp. 242-251.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, Letter from Anu Sundaresan, May 18, 2000, 1 page.

* cited by examiner

INHIBITING OF A CO-ISSUING INSTRUCTION IN A PROCESSOR HAVING DIFFERENT PIPELINE LENGTHS

This application claims benefit of priority to U.S. Provisional Application Ser. No. 60/324,344, filed Sep. 24, 2001, which is incorporated herein by reference in its entirety.

BACKGROUND OF THE INVENTION

1. Field of the Invention

This invention is related to the field of processors and, more particularly, to issue and retirement mechanisms in processors.

2. Description of the Related Art

Processors typically execute instructions in one or more pipelines. A first pipeline stage, referred to as the issue stage, is the stage at which a given instruction selected for issue. A second pipeline stage, referred to as the retirement stage or the graduation stage, is the stage at which the instruction commits its results to architected state. The retirement/graduation stage may also be that stage at which an instruction reports any exceptions that may have been experienced during execution, or a different stage may be used for this purpose.

To support precise exceptions: (i) the instructions prior to an instruction experiencing an exception update architected state prior to the exception occurring; and (ii) instructions subsequent to the instruction experiencing the exception do not update architected state prior to the exception occurring. If various pipelines in a processor have different lengths between issue and exception reporting or retirement/graduation, a mechanism is needed to ensure that precise exceptions are supported (assuming the architecture being implemented by the processor includes precise exceptions).

SUMMARY OF THE INVENTION

A processor is described which includes a first pipeline, a second pipeline, and a control circuit. The first pipeline includes a first stage at which instruction results are committed to architected state. The first stage is separated from an issue stage of the first pipeline by a first number of stages. The second pipeline includes a second stage at which an exception is reportable, wherein the second stage is separated from the issue stage of the second pipeline by a second number of stages which is greater than the first number. The control circuit is configured to inhibit co-issuance of a first instruction to the first pipeline and a second instruction to the second pipeline if the first instruction is subsequent to the second instruction in program order. A carrier medium comprising one or more data structures representing the processor is also contemplated.

A method is contemplated. Co-issuance of a first instruction to a first pipeline and a second instruction to a second pipeline is inhibited if the first instruction is subsequent to the second instruction in program order. The first pipeline includes a first stage at which instruction results are committed to architected state, wherein the first stage is separated from an issue stage of the first pipeline by a first number of stages. The second pipeline includes a second stage at which an exception is reportable, wherein the second stage is separated from the issue stage of the second pipeline by a second number of stages which is greater than the first number.

BRIEF DESCRIPTION OF THE DRAWINGS

The following detailed description makes reference to the accompanying drawings, which are now briefly described.

Figure 1:
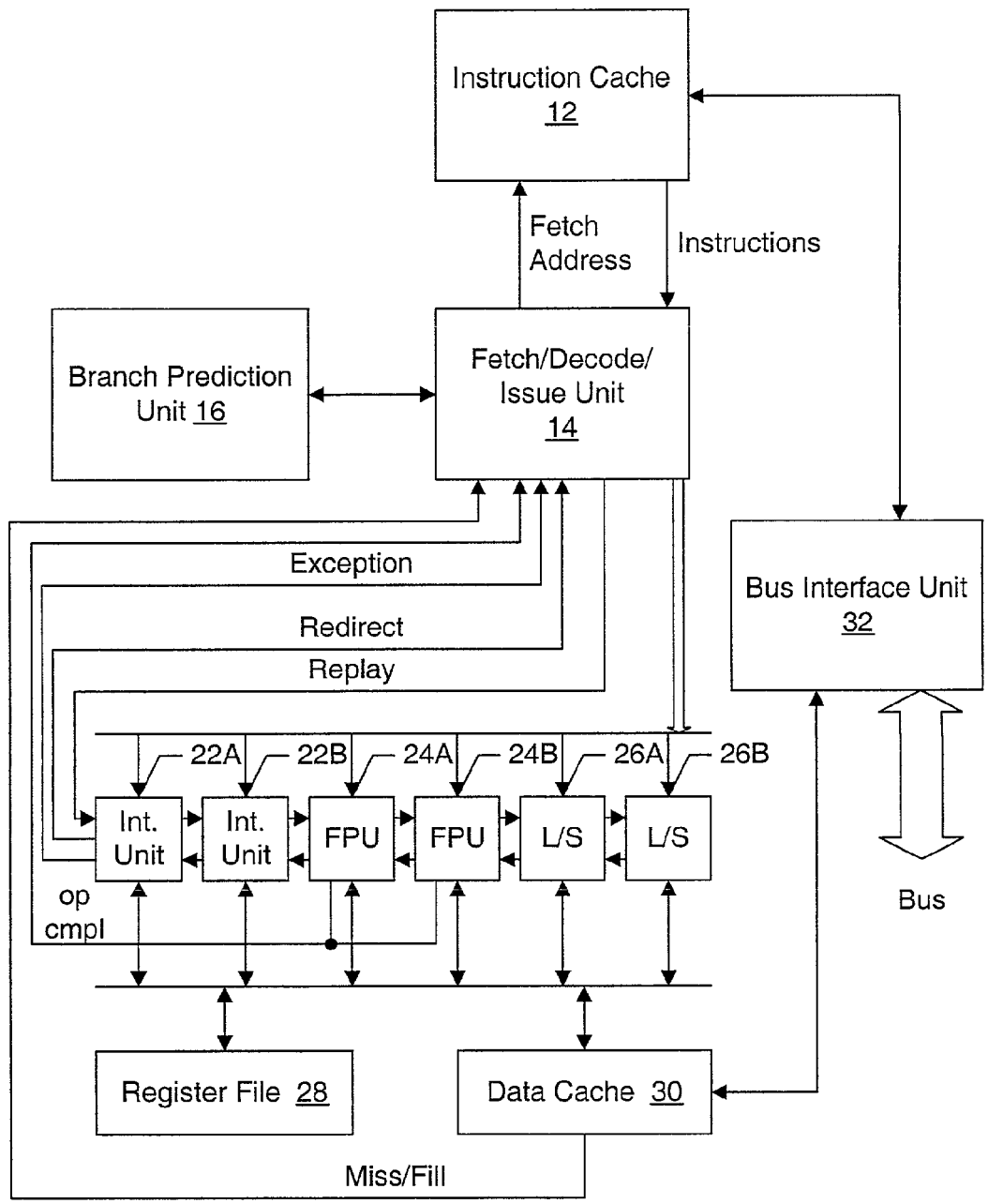
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A-22B, a set of floating point execution units 24A-24B, a set of load/store execution units 26A-26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A-22B, 24A-24B, and 26A-26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A-22B, 24A-24B, and 26A-26B. Additionally, the fetch/issue/decode unit 14 is coupled to receive a redirect indication from the integer unit 22A, op completing (op cmpl) indications from the floating point execution units 24A-24B, exception indications from the execution units 22A-22B, 24A-24B, and 26A-26B, and miss/fill indications from the data cache 30. The fetch/issue/decode unit 14 is coupled to provide a replay signal to the execution units 22A-22B, 24A-24B, and 26A-26B. The execution units 22A-22B, 24A-24B, and 26A-26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more issue queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A-22B are generally capable of handling integer arithmetic/logic operations, shifts, rotates, etc. At least the integer execution unit 22A is configured to execute branch instructions, and in some embodiments both of the integer execution units 22A-22B may handle branch instructions. In one implementation, only the execution unit 22B executes integer multiply and divide instructions although both may handle such instructions in other embodiments. The floating point execution units 24A-24B similarly execute the floating point instructions. The integer and floating point execution units 22A-22B and 24A-24B may read and write operands to and from the register file 28 in the illustrated embodiment, which may include both integer and floating point registers. The load/store units 26A-26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

The redirect, replay, op cmpl, exception, and miss/fill indications may be used in the management of speculative instruction execution and dependency management, as described in more detail below. Generally, the redirect indication may indicate whether or not a predicted branch was predicted correctly. The op cmpl indication may be used for long latency floating point instructions, to indicate that the operation will be completing. The indication may be provided a number of clock cycles before the operation will be completing (e.g. 9 clock cycles, in one embodiment). The miss indication may indicate cache misses (one for each load/store unit 26A-26B). The fill indication may indicate that fill data is returning (which may include an indication of the register number for which fill data is being returned). Alternatively, the fill indication may be provided by the bus interface unit 32 or any other circuitry. Each of execution units 22A-22B, 24A-24B, and 26A-26B may indicate whether or not an instruction experiences an exception using the corresponding exception indication. The replay indication may be provided by the fetch/decode/issue unit 14 if a replay condition is detected for an instruction.

Scoreboarding

In one embodiment, the processor 10 may include a set of scoreboards designed to provide for dependency maintenance while allowing for certain features of the processor 10. In one implementation, for example, the processor 10 may support zero cycle issue between a load and an instruction dependent on the load data and zero cycle issue between a floating point instruction and a dependent floating point multiply-add instruction where the dependency is on the add operand. That is, the load and the dependent instruction may be issued concurrently or the floating point instruction and the dependent floating point multiply-add instruction may be issued concurrently.

The processor 10 may implement a pipeline in which integer and floating point instructions read their operands after passing through one or more skew stages. The number of skew stages may be selected so as to perform the operand read in a stage in which a concurrently issued load instruction is able to forward load data (assuming a hit in the data cache 30). Thus, the forwarded load data may bypass the operand reads from the register file 28 and be provided for execution of the dependent instruction. Similarly, the operand read for the add operand of the floating point multiply-add instruction may be delayed until the add operation is to be started. In this manner, the instructions and their dependent instructions may be issued concurrently. The scoreboards and associated issue control circuitry may be designed to reflect the above features.

The scoreboards may further be designed to correctly track instructions when replay/redirects occur and when exceptions occur. A redirect occurs if a predicted branch is executed and the prediction is found to be incorrect. Since the subsequent instructions were fetched assuming the prediction is correct, the subsequent instructions are canceled and the correct instructions are fetched. The scoreboard indications generated by the subsequent instructions are deleted from the scoreboards in response to the redirect. However, instructions which are prior to the branch instruction are not canceled and, if still outstanding in the pipeline, remain tracked by the scoreboards. Similarly, an instruction may be replayed if one of its operands is not ready when the operand read occurs (for example, a load miss or a prior instruction requiring more clock cycles to execute than assumed by the issue logic) or a write after write dependency exists when the result is to be written. An instruction is "replayed" if its current execution is canceled (i.e. it does not update architected state of the processor 10) and it is later re-issued from the issue queue. In other words, the instruction is retained in the issue queue for possible replay after it is issued. In one embodiment, execution of instructions is in order and the replay also causes the cancellation of subsequent instructions (including the deletion of corresponding scoreboard indications), but prior instructions (and their scoreboard indications) are retained. Other embodiments may be designed for out of order, in which case the cancellation/deletion from the scoreboard for the subsequent instructions may be selective based on whether or not the subsequent instruction has a dependency on a replayed instruction. Additionally, an instruction may experience an exception (e.g. architected exceptions), which causes subsequent instructions to be canceled but again prior instructions are not canceled.

Generally, a scoreboard tracks which registers are to be updated by instructions outstanding within the pipeline. The scoreboard may be referred to as "tracking instructions" herein for brevity, which it may do using scoreboard indications for each register. The scoreboard includes an indication for each register which indicates whether or not an update to the register is pending in the pipeline. If an instruction uses the register as an operand (either source or destination), the instruction may be delayed from issue or replayed (depending on the scoreboard checked, as discussed below). In this fashion, dependencies between the instructions may be properly handled. When an instruction is to be represented in a scoreboard, the indication in the scoreboard corresponding to the destination register of that instruction is set to a state indicating that the register is busy (that an update is pending). The indication is changed to a non-busy state based on when the register is updated by the instruction. The indication may actually be changed to the non-busy state prior to the update of the register, if it is known that an instruction released by changing the indication does not access the register prior to the actual update (or prior to a bypass being available, if the released instruction is reading the register).

Several scoreboards may be used to track instructions and to provide for correction of the scoreboards in the event of replay/redirect (which occur in the same pipeline stage in this embodiment, referred to as the "replay stage" herein, although other embodiments may signal replay and redirect at different pipeline stages) or exception (signaled at a graduation stage of the pipeline in which the instruction becomes committed to updating architected state of the processor 10). The issue scoreboard may be used by the issue control logic to select instructions for issue. The issue scoreboard may be speculatively updated to track instructions early in the pipeline (with assumptions made that cache hits occur on loads and that branch predictions are correct). The replay scoreboard may track instructions which have passed the replay stage. Thus, if replay occurs the replay scoreboard may contain the correct state to be restored to the issue scoreboards. The graduation scoreboard may track instructions which have passed the graduation stage (e.g. cache misses or long latency floating point operations). If an exception occurs, the graduation scoreboard may contain the correct state to be restored to the replay scoreboard and the issue scoreboard.

Figure 2:
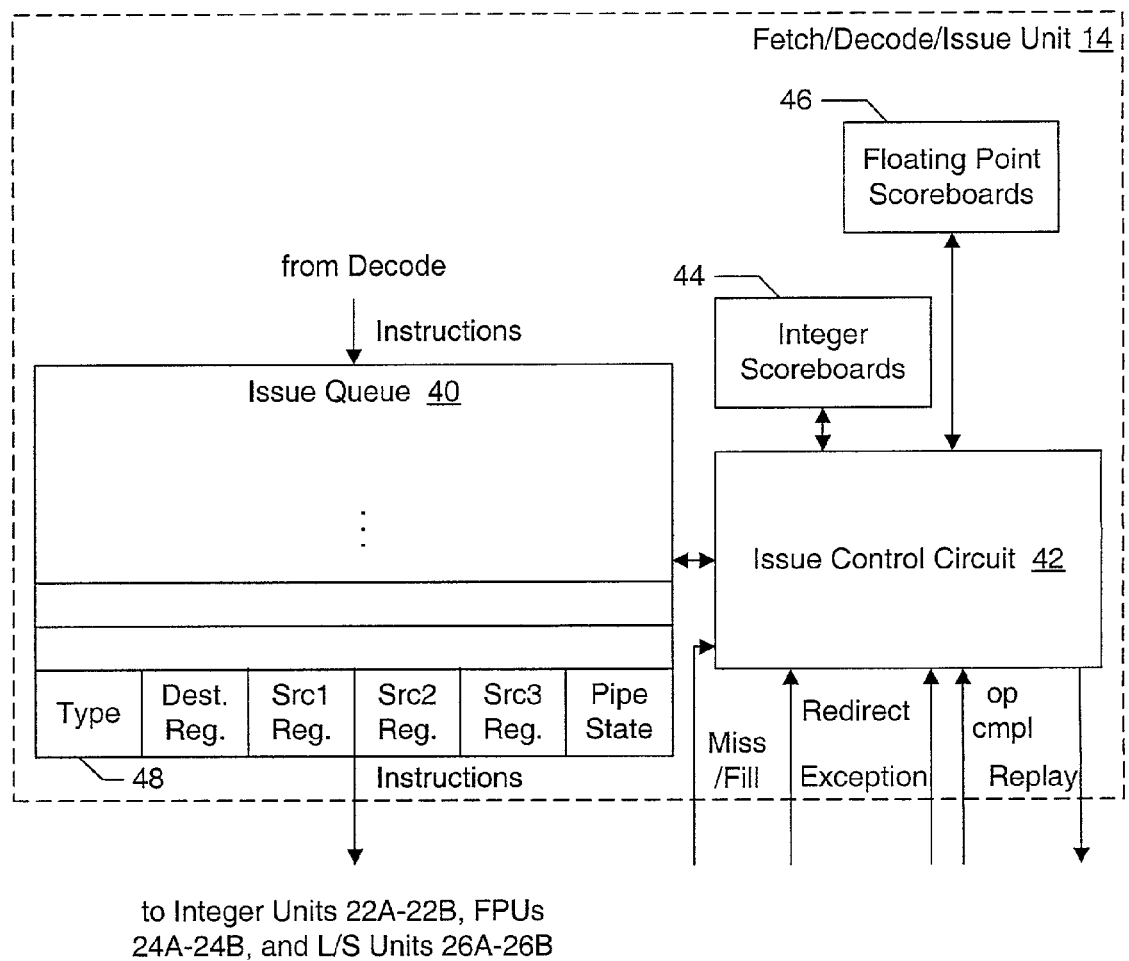
FIG. 2 is a block diagram of one embodiment of a portion of the fetch/decode/issue unit 14.

Turning next to FIG. 2, a block diagram of one embodiment of a portion of the fetch/decode/issue unit 14 is shown. Other embodiments are possible and contemplated. In the embodiment of FIG. 2, the fetch/decode/issue unit 14 includes an issue queue 40, an issue control circuit 42, integer scoreboards 44, and floating point scoreboards 46. The issue queue 40 is coupled to receive instructions from the decode circuitry (not shown), and is configured to provide instructions to the integer execution units 22A-22B, the floating point execution units 24A-24B, and the load/store units 26A-26B. The issue queue 40 is coupled to the issue control circuit 42, which is further coupled to the integer scoreboards 44 and the floating point scoreboards 46. The issue control circuit 42 is further coupled to receive the miss/fill indications, the redirect indication, the exception indications, and the op cmpl indications shown in FIG. 1, and to provide the replay indication shown in FIG. 1.

The issue queue 40 receives decoded instructions from the decode logic and queues the instructions until they are graduated. The issue queue comprises a plurality of entries for storing instructions and related information. Certain fields of information in an exemplary entry 48 are shown in FIG. 2. The type of instruction is stored in a type field of the entry. The type may be the opcode of the instruction (possibly decoded by the decode logic), or may be a field which indicates instruction types used by the issue control circuit 42 for selecting instructions for issue. For example, the type field may indicate at least the following instruction types: integer load instruction, integer instruction, floating point load instruction, short floating point instruction, floating point multiply-add instruction, and long latency floating point instruction. The destination register number is stored in a dest. reg. field. Similarly, the source register numbers may be stored in the src1 reg. field, the src2 reg. field, and the src3 reg. field. Most instructions may have two source register operands indicated by the register numbers in the src1 and src2 reg. fields. However, the floating point multiply-add instruction may have three source operands (e.g. src1 and src2 may be the multiplicands and src3 may be the add operand).

Finally, a pipe state field is shown. The pipe state stored in the pipe state field may track the pipe stage that the corresponding instruction is in. The pipe state may be represented in any fashion. For example, the pipe state may be a bit vector with a bit corresponding to each pipeline stage. The first bit may be set in response to the issuance of the instruction, and the set bit may be propagated down the bit vector on a cycle-by-cycle basis as the instruction progresses through the pipeline stages. Alternatively, the pipe state may be a counter which is incremented as the instruction progresses from pipeline stage to pipeline stage. In one embodiment, the pipelines in the integer, floating point, and load/store execution units do not stall (instruction replay may be used where an instruction may otherwise stall in the pipeline). Accordingly, the pipe state may change to the next stage each clock cycle until the instruction is either canceled or graduates.

The pipe state may be used by the issue control circuit 42 to determine which pipeline stage a given instruction is in. Thus, the issue control circuit 42 may determine when source operands are read for a given instruction, when the instruction has reached the replay or graduation stage, etc. For the long latency floating point instructions (those for which the floating point execution units 24A-24B indicate that the operation is completing using the op cmpl signals), the pipe state may be altered when the op cmpl signal is received and may be used to track the remaining pipeline stages of those instructions. For example, in one embodiment, the op cmpl signal may be asserted for a given floating point instruction 9 cycles before the floating point instruction completes (writes its result). The pipe state may track the remaining 9 cycles for updating the scoreboards as discussed below. Other embodiments may track the pipeline stage for each instruction in other fashions as well.

The issue control circuit 42 scans the instructions in the issue queue 40 and selects instructions for issue to the integer execution units 22A-22B, the floating point execution units 24A-24B, and the load/store units 26A-26B. The selection of instructions may be affected by the scoreboards maintained by the issue control circuit 42. The issue control circuit 42 maintains the integer scoreboards 44 for integer instructions (which read and write integer registers in the register file 28) and the floating point scoreboards 46 for floating point instructions (which read and write floating point registers in the register file 28 separate from the integer registers). Load instructions may be tracked in one of the integer scoreboards 44 or the floating point scoreboards 46 depending on whether the load is an integer load (its destination register is an integer register) or a floating point load (its destination register is a floating point register). Additional details for an exemplary embodiment of the issue control circuit 42 for managing the scoreboards and using the scoreboards for issue selection is described with respect to FIGS. 3-18.

If an instruction is selected for issue, the issue control circuit 42 may signal the issue queue 40 to output the instruction to the unit selected by the issue control circuit 42 for executing the corresponding instruction. Load/store instructions are issued to one of the load/store units 26A-26B. Integer instructions are issued to one of the integer execution units 22A-22B. In the present embodiment, certain integer instructions may be issued to either the load/store units 26A-26B or the integer execution units 22A-22B (e.g. instructions which may be executed using the address generation hardware in the load/store pipeline, such as add instructions). Floating point instructions are issued to the floating point execution units 24A-24B.

Generally, the issue control circuit 42 attempts to concurrently issue as many instructions as possible, up to the number of pipelines to which the issue control circuit 42 issues instructions (e.g. 6 in this embodiment). In some embodiments, the maximum number of concurrently issued instructions may be less than the number of pipelines (e.g. 4 in one embodiment).

In addition to using the scoreboards for issuing instructions, the issue control circuit 42 may use the scoreboards to detect replay scenarios. For example, if a load miss occurs and an instruction dependent on the load was scheduled assuming a cache hit, the dependent instruction is replayed. When the dependent instruction reads its operands (for a read after write (RAW) dependency) or is prepared to write its result (for a write after write (WAW) or write after read (WAR) dependency), the replay scoreboards may be checked to determine if the register being read or written is indicated as busy. If it is, a replay scenario is detected. The issue control circuit 42 may signal the replay to all execution units using the replay indication. In response to the replay indication, the execution units may cancel the replayed instruction and any subsequent instructions in program order. The issue control circuit 42 may update the pipe state to indicate the replayed instructions are not in the pipe, allowing the instructions to be reissued from the issue queue 40.

If a redirect is signaled by the integer execution unit 22A or if a replay scenario is detected by the issue control circuit 42 using the scoreboards 44 and 46, the issue control circuit 42 may recover the state of the issue scoreboards using the replay scoreboards. Similarly, the state of the issue scoreboards and the replay scoreboards may be recovered using the graduation scoreboards if an exception is signaled by an execution unit 22A-22B, 24A-24B, or 26A-26B.

A read-after-write (RAW) dependency exists between a first instruction which is prior to a second instruction in program order if the first instruction writes a register (has the register as a destination register) and the second instruction reads the register. A write-after-write (WAW) dependency exists between the first instruction and the second instruction exists if both the first and second instructions write the same register.

Figure 3:
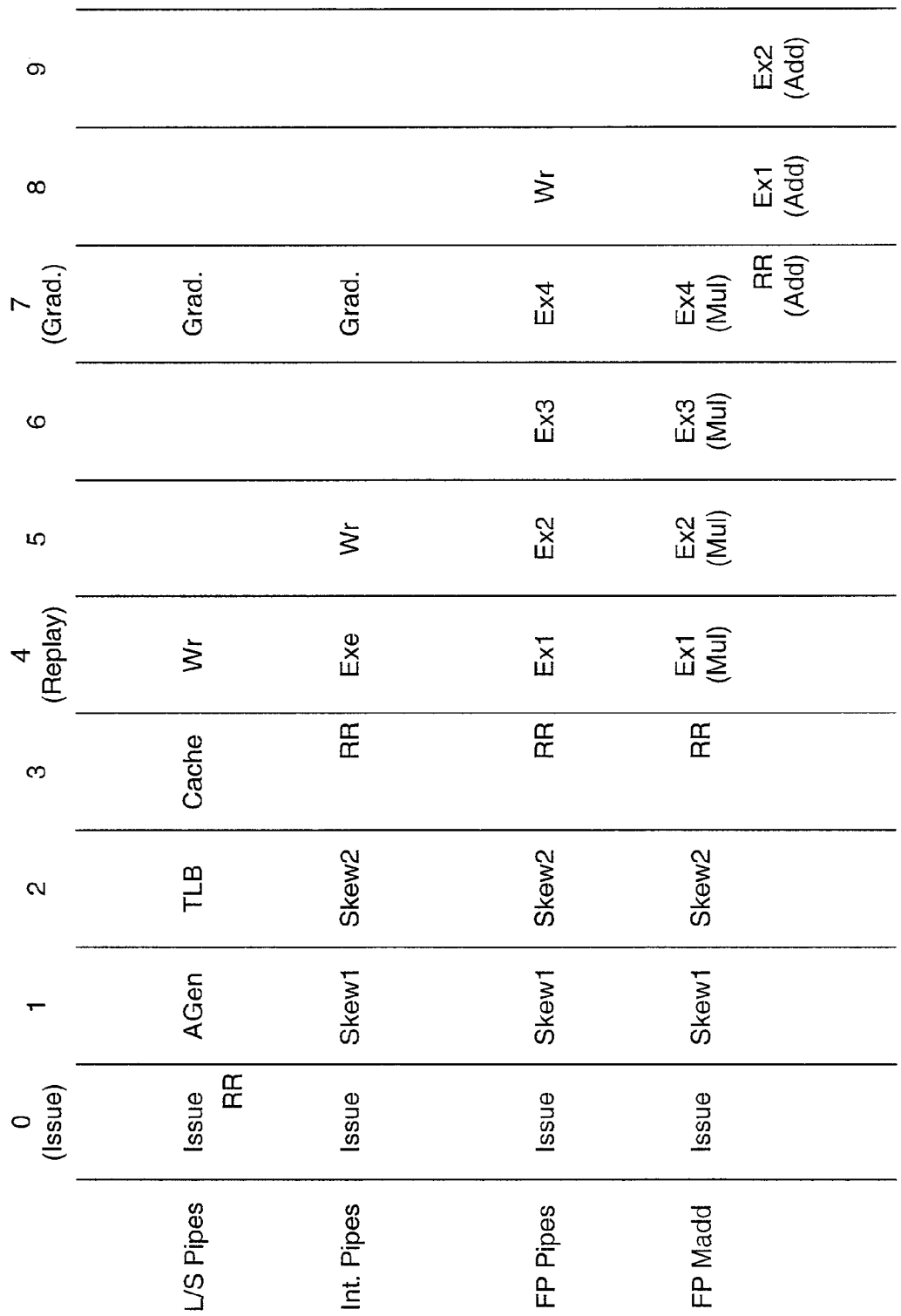
FIG. 3 is a timing diagram illustrating one embodiment of pipelines which may be used in one embodiment of the processor shown in FIG. 1.

Turning now to FIG. 3, a timing diagram is shown illustrating the pipelines implemented in one embodiment of the processor 10. Other embodiments are possible and contemplated. In FIG. 3, 10 clock cycles are illustrated. The clock cycles are delimited by solid vertical lines and are labeled 0 through 9 at the top. Clock cycle 0 is the issue stage. Clock cycle 4 is the replay stage. Clock cycle 7 is the graduation stage for the integer and floating point pipelines. The pipelines, beginning with the issue stage, for the load/store units 26A-26B (L/S pipes in FIG. 3), the integer units 22A-22B (Int. pipes in FIG. 3), and the floating point unit for short floating point operations (FP pipes in FIG. 3) and the floating point multiply-add instruction (FP Madd in FIG. 3) are illustrated.

The load/store pipelines include a register file read (RR) in the issue stage, followed by an address generation (AGen) stage in clock cycle 1, a translation lookaside buffer (TLB) stage in clock cycle 2, a cache read (Cache) stage in clock cycle 3, a register file write (Wr) stage in clock cycle 4, and a graduation (Grad.) stage in clock cycle 7. In the issue stage, the load/store instruction is selected for issue (and the register operands are read near the end of the issue stage as well). In the AGen stage, the virtual address of the load or store operation is generated by adding one or more address operands of the load/store instruction. In the TLB stage, the virtual address is translated to a physical address. The physical address is looked up in the data cache 30 in the Cache stage (and the data may be forwarded in this stage). In the Wr stage, the data corresponding to a load is written into the register file 28. Finally, in the graduation stage, the load instruction is committed or an exception corresponding to the load is signaled. Each of the load/store units 26A-26B may implement independent load/store pipelines and thus there are two load/store pipelines in the present embodiment. Other embodiments may have more or fewer load/store pipelines.

The integer pipelines include an issue stage in clock cycle 0, skew1 and skew2 stages in clock cycles 1 and 2, respectively, a register file read (RR) stage in clock cycle 3, an execute (Exe) stage in clock cycle 4, a register file write (Wr) stage in clock cycle 5, and a graduation (Grad.) stage in clock cycle 7. In the issue stage, the integer instruction is selected for issue. The skew1 and skew2 stages may be used to align the register file read stage of the integer pipelines (clock cycle 3) with the data forwarding stage from the L/S pipelines (Cache stage—clock cycle 3). The instructions may simply pass through the skew1 and skew2 stages without performing any processing on the instructions. In the RR stage, source registers for the instruction are read (or data is forwarded from a load instruction or a preceding integer instruction (in the Exe stage) on which the instruction is dependent). The instruction is executed in the Exe stage, and the result is written to the register file 28 in the Wr stage. The instruction graduates in the graduation stage. Each of the integer execution units 22A-22B may implement independent integer pipelines and thus there are two integer pipelines in the present embodiment. Other embodiments may have more or fewer integer pipelines.

The floating point execution units 24A-24B each implement the floating point pipeline (which includes the short floating point pipeline illustrated as the FP pipes in FIG. 3, the pipeline for the multiply-add instruction illustrated as FP Madd in FIG. 3, and the long floating point pipeline for the long latency floating point instructions, not shown in FIG. 3). Thus, there are two floating point pipelines in the present embodiment. Other embodiments may have more or fewer floating point pipelines.

For the short floating point operations (which may generally include most of the floating point arithmetic instructions such as add, subtract, multiply, etc.), the FP pipes pipeline shown in FIG. 3 may apply. Like the integer pipeline, the FP pipes pipeline includes an issue stage in clock cycle 0, skew1 and skew2 stages in clock cycles 1 and 2, respectively, and a register file read stage (RR) in clock cycle 3. The short floating point instruction may comprise four clock cycles of execution (Ex1, Ex2, Ex3, and Ex4 in clock cycles 4, 5, 6, and 7, respectively) and a register file write (Wr) stage in clock cycle 8. The instruction is executed through the four execute stages and the result is written in the Wr stage.

The floating point multiply-add instruction is similar to the short floating point instruction except that the multiply-add instruction passes through the execution portion of the pipeline twice. Thus, similar to the short floating point instructions, the multiply-add instruction has an issue stage in clock cycle 0, skew1 and skew2 stages in clock cycles 1 and 2, respectively, a register file read (RR) stage in clock cycle 3, and 4 execute stages (Ex1-Ex4 in clock cycles 4-7). Additionally, in clock cycle 7, a register file read stage (RR) is included for the add operand used by the multiply-add instruction. Generally, the floating point multiply-add instruction may include three source operands. Two of the source operands are the multiplicands for the multiply operation, and these operands are read in the RR stage in clock cycle 3. The third operand is the operand to be added to the result of the multiply. Since the third operand is not used until the multiply operation is complete, the third operand is read in the second RR stage in clock cycle 7. The floating point multiply-add pipe then passes through the execute stages again (Ex1-Ex4 in clock cycles 8-11, although only clock cycles 8 and 9 are shown in FIG. 3) and then a register file write (Wr) stage is included in clock cycle 12 (not shown).

The long latency floating point instructions (which may include such operations as divide, square root, reciprocal, and other complex functions such as sine, cosine, etc.) are processed in the floating point pipeline as well. The long latency pipeline is not shown in FIG. 3, but generally includes the issue stage in clock cycle 0, the skew1 and skew2 stages in clock cycles 1 and 2, respectively, and the register file read (RR) stage in clock cycle 3. Execution of the instruction begins in clock cycle 4 and continues for N clock cycles. The number of clock cycles (N) may vary depending on which of the long latency floating point instructions is executed, and may, in some cases, be dependent on the operand data for the instruction.

In the embodiment of FIG. 3, clock cycle 4 is the replay stage for the pipelines. That is, replay is signaled in the stage shown in clock cycle 4 for each instruction. Other embodiments may have the replay stage at other stages, and may have different replay stages in different pipelines. The detection of a replay may occur prior to the replay stage, but the replay stage is the stage at which the replay is signaled, the replayed instruction is canceled from the pipeline, and subsequent instructions are also canceled for replay. Additionally, redirects for mispredicted branches also occur in the replay stage in the present embodiment, although other embodiments may have redirects and replays occur at different stages. The graduation stage (at which exceptions are signaled) is the stage at clock cycle 7 in the load/store and integer pipelines. A graduation stage is not shown for the floating point instructions. Generally, floating point instructions may be programmably enabled in the processor 10 (e.g. in a configuration register). If floating point exceptions are not enabled, then the floating point instructions do not cause exceptions and thus the graduation of floating point instructions may not matter to the scoreboarding mechanisms. If floating point exceptions are enabled, in one embodiment, the issuing of subsequent instructions may be restricted. An embodiment of such a mechanism is described in further detail below.

It is noted that, while the present embodiment includes two skew stages in the integer and floating point pipelines, other embodiments may include more or fewer skew stages. The number of skew stages may be selected to align the register file read stage in the integer and floating point pipelines with the stage at which load data may be forwarded, to allow concurrent issuance of a load instruction and an instruction dependent on that load instruction (i.e. an instruction which has the destination register of the load instruction as a source operand).

Figure 4:
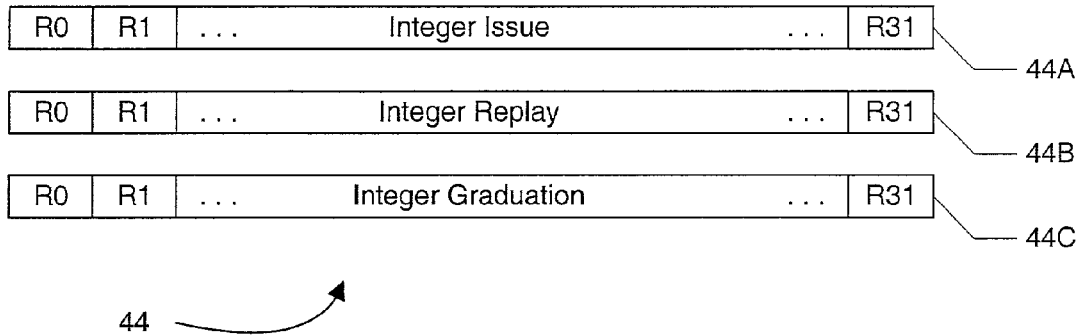
FIG. 4 is a block diagram of one embodiment of a set of integer scoreboards.

Turning now to FIG. 4, a block diagram illustrating one embodiment of the integer scoreboards 44 is shown. Other embodiments are possible and contemplated. In the embodiment of FIG. 4, the integer scoreboards include an integer issue scoreboard 44A, an integer replay scoreboard 44B, and an integer graduation scoreboard 44C.

Each scoreboard includes an indication for each integer register. In the present embodiment, there are 32 integer registers (R0-R31). Other embodiments may include more or fewer integer registers, as desired. In one embodiment, the indication may be a bit which may be set to indicate the register is busy (and thus a dependent instruction is not to be issued or is to be replayed, depending on the scoreboard) and clear to indicate that the register is not busy (and thus a dependent instruction is free to be issued or does not require replay). The remainder of this description will use a bit with the set and clear states as set forth above. However, other embodiments may reverse the meanings of the set and clear states of the bit or may use multibit indications.

Figure 5:
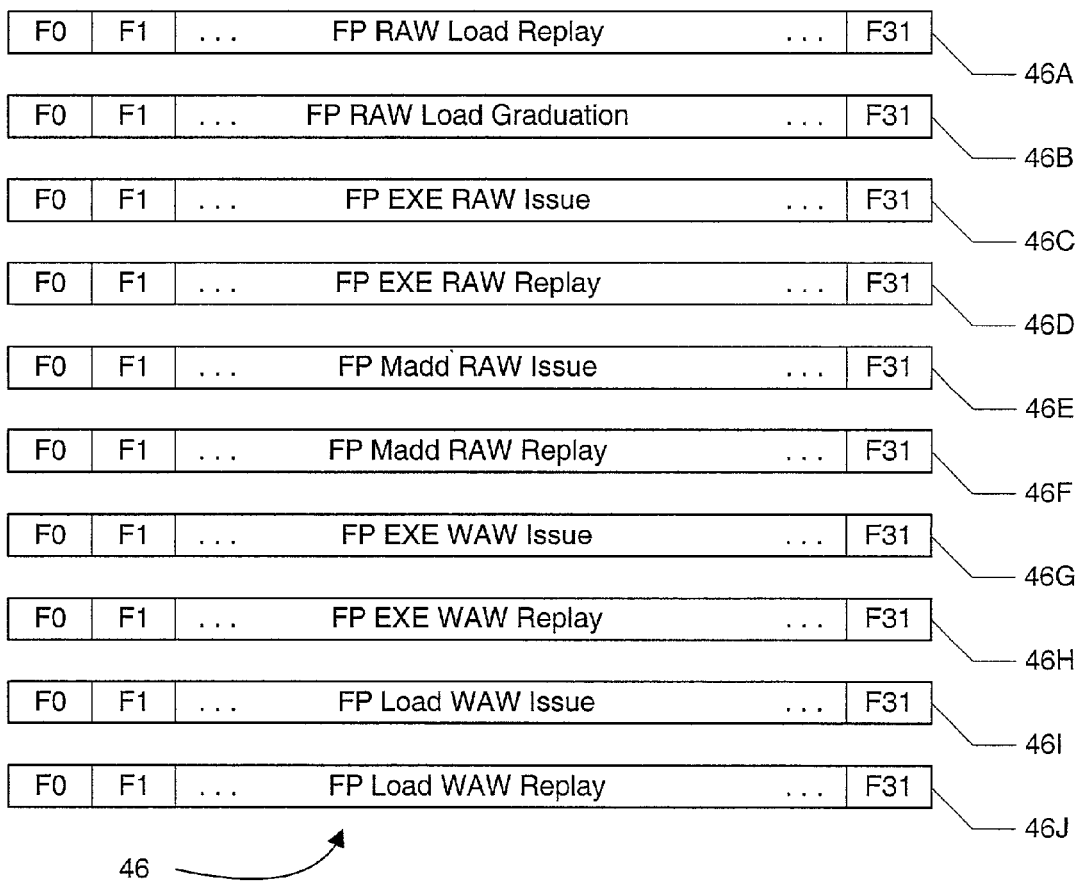
FIG. 5 is a block diagram of one embodiment of a set of floating point scoreboards.

Turning now to FIG. 5, a block diagram illustrating one embodiment of the floating point scoreboards 46 is shown. Other embodiments are possible and contemplated. In the embodiment of FIG. 5, the floating point scoreboards include a floating point (FP) read-after-write (RAW) load reply scoreboard 46A, an FP RAW load graduation scoreboard 46B, an FP execute (EXE) RAW issue scoreboard 46C, an FP EXE RAW replay scoreboard 46D, an FP Madd RAW issue scoreboard 46E, an FP Madd RAW issue scoreboard 46F, an FP EXE write-after-write (WAW) issue scoreboard 46G, an FP EXE WAW replay scoreboard 46H, an FP load WAW issue scoreboard 46I, and an FP load WAW replay scoreboard 46J.

Each scoreboard includes an indication for each floating point register. In the present embodiment, there are 32 floating point registers (F0-F31). Other embodiments may include more or fewer floating point registers, as desired. In one embodiment, the indication may be a bit which may be set to indicate the register is busy (and thus a dependent instruction is not to be issued or is to be replayed, depending on the scoreboard) and clear to indicate that the register is not busy (and thus a dependent instruction is free to be issued or does not require replay). The remainder of this description will use a bit with the set and clear states as set forth above. However, other embodiments may reverse the meanings of the set and clear states of the bit or may use multibit indications.

Integer Scoreboarding and Issue

The operation of the issue control circuit 42 for maintaining the issue scoreboards 44 shown in FIG. 4 and for issuing integer instructions and detecting replays will next be described. Generally, the integer scoreboards may track integer loads. Other integer instructions may be executable in one clock cycle (either the AGen stage, if the integer instruction is issued to the load/store pipeline, or the Exe stage in the integer pipeline) and may forward results to the register file read stages for dependent instructions, and thus scoreboarding of these instructions may not be required. In one embodiment, the integer multiply instruction uses more than one clock cycle for execution and may also be scoreboarded (the bit for the multiply instruction's destination register may be set in response to issuing the multiply instruction and may be cleared in response to the multiply instruction reaching the pipeline stage that a result may be forwarded from).

The integer issue scoreboard 44A may track integer load instructions assuming that the integer load will hit in the cache. Thus, if an integer load instruction is issued, the issue control circuit 42 may set the scoreboard bit corresponding to the destination register of the integer load instruction. The load instruction data is forwarded from the Cache stage in the present embodiment, so the issue control circuit 42 may clear the scoreboard bit corresponding to the destination register of the integer load instruction when the integer load instruction reaches the TLB stage.

If the load instruction is a miss in the data cache 30 (determined in the Wr stage of the load/store pipeline, in one embodiment), the update to the destination register of the load instruction is pending until the miss data is returned from memory. Retrieving the data from memory may involve more clock cycles than exist in the pipeline before the graduation stage (e.g. on the order of tens or even hundreds of clock cycles or more). Accordingly, the load misses are tracked in the integer replay scoreboard 44B and the integer graduation scoreboard 44C. The issue control circuit 42 may update the integer replay scoreboard 44B in response to a load miss passing the replay stage (setting the bit corresponding to the destination register of the load). In response to the load miss passing the graduation stage, the issue control circuit 42 may set the bit corresponding to the destination register of the load miss in the graduation replay scoreboard 44C. In response to the fill data for the load miss being provided (and thus the destination register being updated), the issue control circuit 42 clears the destination register of the load miss in each of the integer issue, replay, and graduation scoreboards 44A-44C.

During the selection of instructions for issue, the issue control circuit 42 may check the integer issue scoreboard 44A. Particularly, the integer issue scoreboard 44A may selectively be used in the selection of instructions for issue depending on which pipeline the integer instruction is to be issued to. If the integer instruction is to be issued to the load/store pipeline, the issue control circuit 42 may check the integer issue scoreboard 44A and inhibit issue if a source register is busy in the scoreboard. If the integer instruction is to be issued to the integer pipeline, the issue control circuit 42 may not use the contents of the integer issue scoreboard 44A in the issue selection process (since the integer pipeline does not read registers until the load data is to be forwarded to the integer pipelines). If the load is a miss and the integer instruction is dependent, the replaying of the integer instruction may ensure proper instruction execution. Integer load/store instructions are issued to the load/store pipelines and thus the issue control circuit 42 may use the integer issue scoreboard 44A in the issue selection for those instructions as well.

The issue control circuit 42 checks the source registers of integer instructions against the integer replay scoreboard 44B responsive to the integer instruction reaching the register read (RR) pipeline stage to detect whether or not the integer instruction is to be replayed. The issue control circuit may also include in this check the concurrent detection of a load miss in the Wr stage of the load/store pipelines, since such load misses are not yet represented in the integer replay scoreboard 44B and correspond to load instructions which are prior to the integer instructions in program order (and thus the integer instructions may depend on the load miss). In other embodiments, the issue control circuit 42 may delay the check to the clock cycle after the register file read. In such embodiments, the check for concurrently detected load misses may not be used.

In response to a replay or redirect due to branch misprediction, the issue control circuit 42 may copy the contents of the integer replay scoreboard 44B to the integer issue scoreboard 44A. In this fashion, the updates to the integer issue scoreboard 44A due to instructions which were issued but canceled due to the replay may be deleted. Additionally, the state of the scoreboard for instructions which were not canceled (those beyond the replay stage) may be retained. Similarly, in response to an exception, the issue control circuit 42 may copy the contents of the integer graduation scoreboard 44C to both the integer replay scoreboard 44B and to the integer issue scoreboard 44A. In this manner, updates to the integer issue scoreboard 44A and to the integer replay scoreboard 44B in response to instructions which are canceled due to the exception may be deleted from the integer issue and replay scoreboards 44A-44B and the state of the scoreboard for instructions which were not canceled (load misses which have progressed beyond the graduation stage) are retained. In one embodiment, the integer graduation scoreboard 44C is copied to the integer replay scoreboard 44B, which is subsequently copied to the integer issue scoreboard 44A.

FIGS. 6-9 are flowcharts illustrating the operation of one embodiment of the issue control circuit 42 for the integer scoreboards and integer instruction issue. Generally, the circuitry represented by FIGS. 6-9 may determine which pipe stage an instruction is in by examining the pipe state in the corresponding entry of the issue queue 40. Viewed in another way, the circuitry represented by a given decision block may decode the type field in each entry and the corresponding pipe state to detect if an instruction in any issue queue entry is an instruction in the pipe stage searched for by that decision block. The circuitry may also include the indications provided by the execution units and/or the data cache (e.g. the miss indications and fill indications from the data cache 30).

Figure 6:
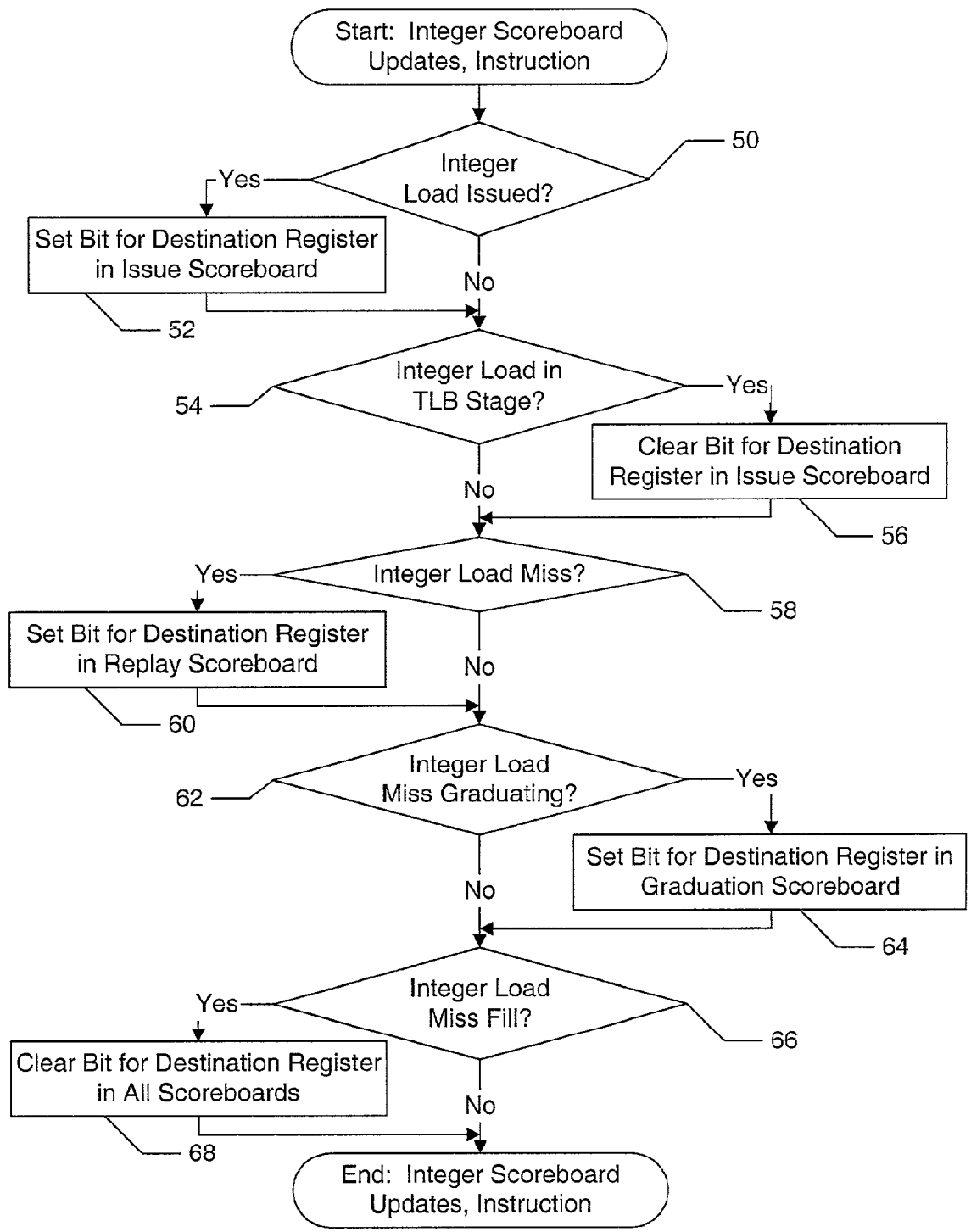
FIG. 6 is a flowchart illustrating one embodiment of updates to the integer scoreboards shown in FIG. 4 due to individual instruction processing.

Turning now to FIG. 6, a flowchart is shown representing operation of one embodiment of circuitry in the issue control circuit 42 for updating the integer scoreboards 44 in response to individual instructions being processed. Other embodiments are possible and contemplated. While the blocks shown in FIG. 6 are illustrated in a particular order for ease of understanding, any order may be used. Furthermore, some blocks may represent independent circuitry operating in parallel with other circuitry. Specifically, in FIG. 6, each decision block may represent independent and parallel circuitry.

If an integer load is issued to one of the load/store pipelines (decision block 50), the issue control circuit 42 sets the bit corresponding to the destination register of the load in the integer issue scoreboard 44A (block 52). If an integer load is in the TLB stage of the load/store pipeline (decision block 54), the issue control circuit 42 clears the bit corresponding to the destination register in the integer issue scoreboard 44A (block 56).

If an integer load miss is detected (decision block 58), the issue control circuit 42 sets the bit corresponding to the destination register in the integer replay scoreboard 44B (block 60). As mentioned above, the pipe state may indicate which load/store pipeline the integer load is in and the stage of the pipeline that it is in. If the integer load is in the stage in which cache hit/miss information is available (e.g. the Wr stage of the load/store pipeline in one embodiment) and the miss indication corresponding to the load/store pipeline that the integer load is in indicates a miss, then an integer load miss may be detected. For example, the miss indication from the data cache 30 may comprise a signal corresponding to each pipeline, which may be asserted if a load in the corresponding pipeline is a miss and deasserted if the load is a hit (or there is no load in the Wr stage that clock cycle). In the present embodiment, the load miss is detected in the replay stage. The integer replay scoreboard 44B may be updated in the clock cycle after the load miss is in the replay stage (thus indicating that the instruction is beyond the replay stage).

If an integer load miss passes the graduation stage (decision block 62), the issue control circuit 42 sets the bit corresponding to the destination register of the load in the integer graduation scoreboard 44C (block 64). Finally, if a fill is received for an integer load miss (decision block 66), the bit corresponding to the destination register of the load is cleared in each of the integer issue scoreboard 44A, the integer replay scoreboard 44B, and the integer graduation scoreboard 44C (block 68). The fill indication may include a tag identifying the issue queue entry storing the load miss which for which the fill data is received to match the fill with the correct load miss. Alternatively, another indication such as the destination register number identifying the destination register of the load miss or a tag assigned by the bus interface unit 32 to the load miss may be used. The destination register is cleared in the integer issue scoreboard 44A because it may have been copied into the integer issue scoreboard 44A from the integer replay scoreboard 44B if a replay occurred, or from the integer graduation scoreboard 44C if an exception occurred.

Figure 7:
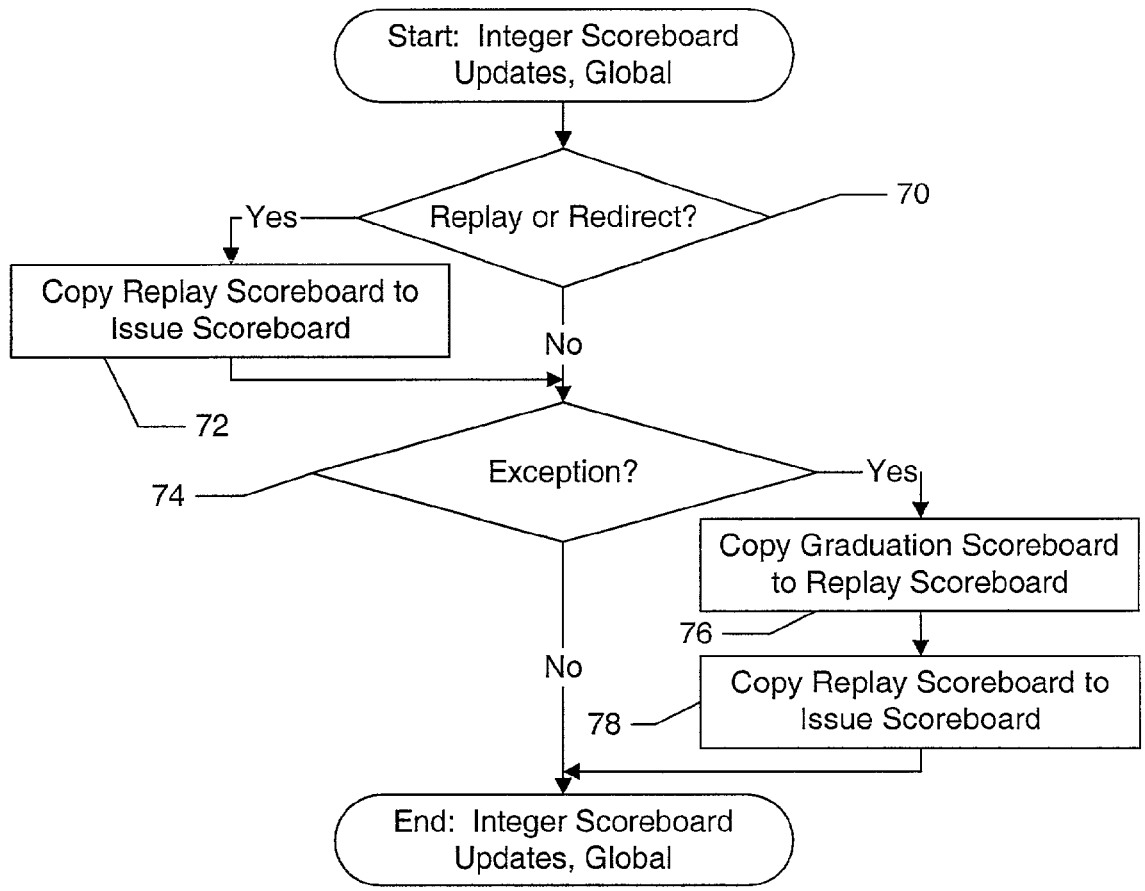
FIG. 7 is a flowchart illustrating one embodiment of global updates to the integer scoreboards shown in FIG. 4 due to replays, redirects, or exceptions.

Turning next to FIG. 7, a flowchart is shown representing operation of one embodiment of circuitry in the issue control circuit 42 for updating the integer scoreboards 44 in a global sense (e.g. each scoreboard bit is updated) in response to various events detected by the issue control circuit 42 or the execution units 22A-22B, 24A-24B, and 26A-26B. Other embodiments are possible and contemplated. While the blocks shown in FIG. 7 are illustrated in a particular order for ease of understanding, any order may be used. Furthermore, some blocks may represent independent circuitry operating in parallel with other circuitry. Specifically, in FIG. 7, each decision block may represent independent and parallel circuitry.

If a replay is detected by the issue control circuit 42 or if a redirect is signaled by the integer execution unit 22A (decision block 70), the issue control circuit 42 copies the contents of the integer replay scoreboard 44B to the integer issue scoreboard 44A (block 72). If an exception is detected by an execution unit 22A-22B, 24A-24B, or 26A-26B (decision block 74), the issue control circuit 42 copies the contents of the integer graduation scoreboard 44C to the integer replay scoreboard 44B (block 76) and may subsequently copy the contents of the integer replay scoreboard 44B (now equal to the contents of the integer graduation scoreboard 44C) to the integer issue scoreboard 44A (block 78). In this manner, both the integer issue scoreboard 44A and the integer replay scoreboard 44B may be recovered to a state consistent with the exception. It is noted that, by first copying the contents of the integer graduation scoreboard 44C to the integer replay scoreboard 44B and then copying the contents of the integer replay scoreboard 44B to the integer issue scoreboard 44A, both scoreboards may be recovered without having two global update paths to the integer issue scoreboard 44A (one for the integer replay scoreboard 44B and one for the integer graduation scoreboard 44C). Other embodiments may provide the two paths and may copy the contents of the integer graduation scoreboard 44C into the integer replay scoreboard 44B and into the integer issue scoreboard 44A in parallel.

It is noted that the copying of the contents of one scoreboard to another may be delayed by one or more clock cycles from the detection of the corresponding event (e.g. the detection of replay/redirect or exception).

Figure 8:
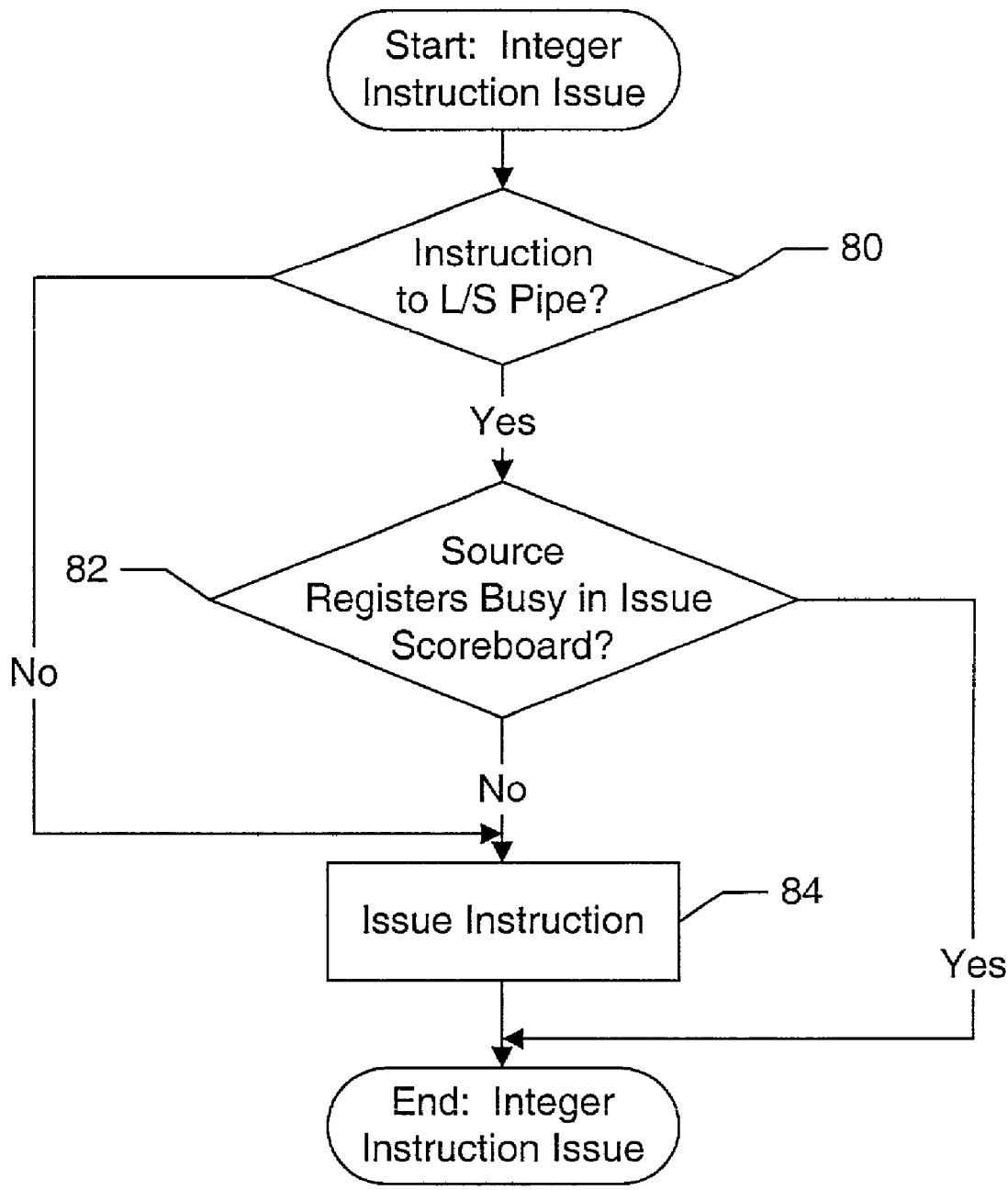
FIG. 8 is a flowchart illustrating one embodiment of issue of integer instructions.

Turning next to FIG. 8, a flowchart is shown representing operation of one embodiment of circuitry in the issue control circuit 42 for determining if a particular integer instruction or integer load/store instruction may be selected for issue. Other embodiments are possible and contemplated. While the blocks shown in FIG. 8 are illustrated in a particular order for ease of understanding, any order may be used. Furthermore, some blocks may represent independent circuitry operating in parallel with other circuitry. The operation of FIG. 8 may represent the circuitry for considering one instruction in one issue queue entry for issue. Similar circuitry may be provided for each issue queue entry, or for a number of issue queue entries at the head of the queue (e.g. for in order embodiments, the number of issue queue entries from which instructions may be issued may be less than the total number of issue queue entries).

If the instruction is being selected for the load/store pipeline (e.g. the instruction is an integer load/store instruction or the instruction is an integer instruction which may be issued to the load/store pipeline and is being considered for issue to the load/store pipeline—decision block 80), the issue control circuit 42 checks the integer issue scoreboard 44A to determine if the source registers of the instruction are indicated as busy (decision block 82). If at least one of the source registers is busy, the instruction is not selected for issue. If the source registers are not busy, the instruction is eligible for issue (assuming any other issue constraints not related to dependencies are met—block 84). Other issue constraints (e.g. prior instructions in program order issuable to the same pipeline) may vary from embodiment to embodiment and may affect whether or not the instruction is actually issued.

If the instruction is not being selected for the load/store pipeline (i.e. the instruction is being selected for the integer pipeline), then the source registers of the instruction are not checked against the integer issue scoreboard 44A (decision block 80, "no" leg) and the instruction may be eligible for issue (assuming other issue constraints are met—block 84). Since the register file read in the integer pipeline is skewed to align with the data forwarding from the load/store pipeline, dependencies on the load destination register need not inhibit issue. If a load miss dependency exists, it may be detected in the replay stage and cause the instruction to be replayed.

Figure 9:
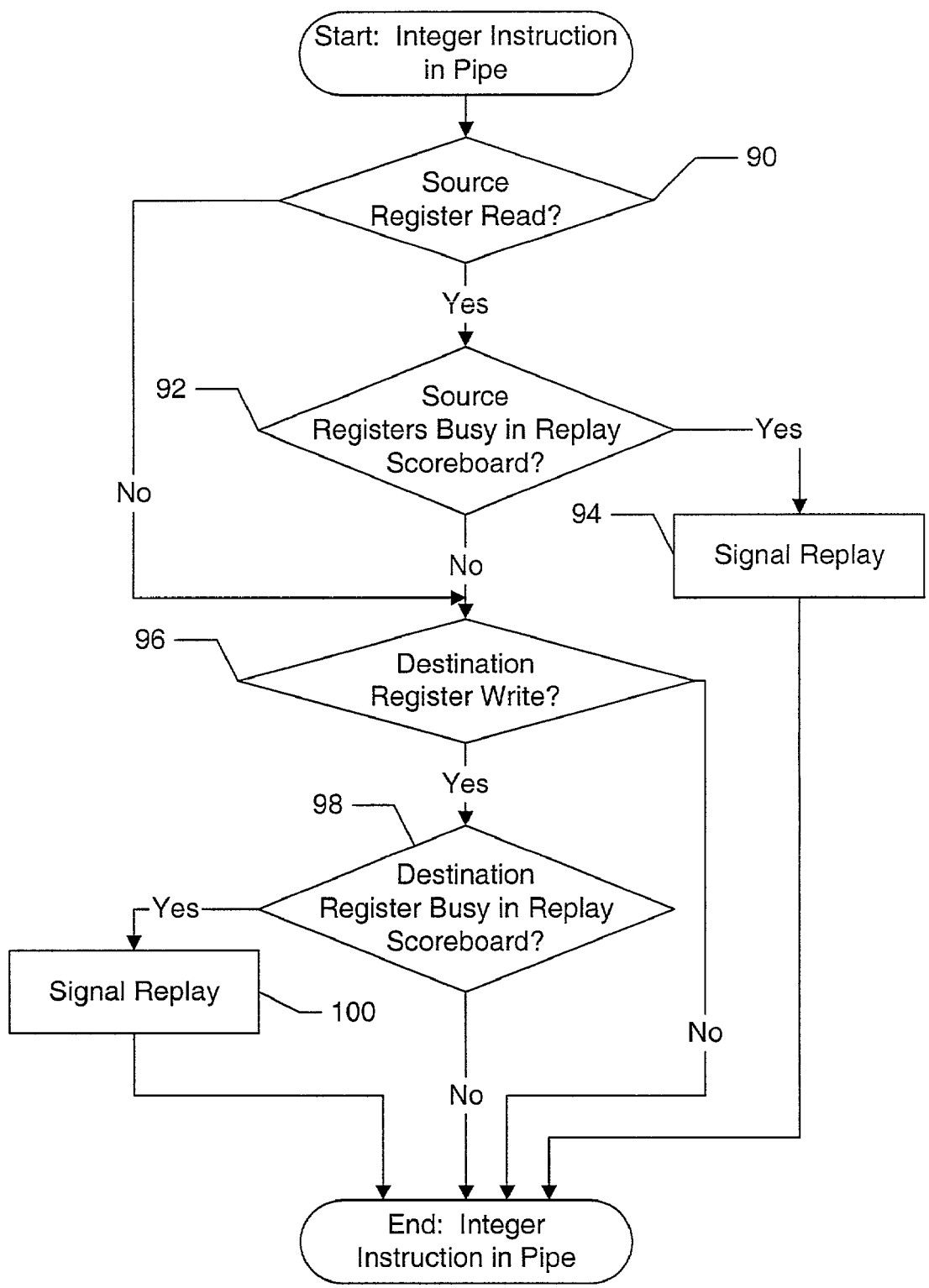
FIG. 9 is a flowchart illustrating operation of one embodiment of integer instructions in the pipelines of the processor.

Turning now to FIG. 9, a flowchart is shown representing operation of one embodiment of circuitry in the issue control circuit 42 for detecting replay scenarios for an integer instruction or integer load/store instruction. Other embodiments are possible and contemplated. While the blocks shown in FIG. 9 are illustrated in a particular order for ease of understanding, any order may be used. Furthermore, some blocks may represent independent circuitry operating in parallel with other circuitry. Specifically, decision blocks 90 and 92 may represent independent circuitry from decision blocks 96 and 98. The operation of FIG. 9 may represent the circuitry for considering one instruction in one issue queue entry for detecting replay. Similar circuitry may be provided for each issue queue entry, or for a number of issue queue entries at the head of the queue, as desired.

For each source register read (decision block 90), the issue control circuit 42 may check the integer replay scoreboard 44B to determine if the source register is busy (decision block 92). If the source register is busy in the integer replay scoreboard 44B, then the instruction is to be replayed due to a RAW dependency on that source register (block 94). The actual assertion of the replay signal may be delayed until the instruction reaches the replay stage, if the check is done prior to the replay stage. For example, in one embodiment, the check for source registers is performed in the register file read (RR) stage of the integer pipeline and in the AGen stage of the load/store pipeline. In such an embodiment, the check may also include detecting a concurrent miss in the load/store pipeline for a load having the source register as a destination (since such misses may not yet be recorded in the integer replay scoreboard 44B). It is noted that, in the load/store pipeline, the source register replay check is performed after the source registers have been read. The state of the integer replay scoreboard 44B from the previous clock cycle may be latched and used for this check, to ensure that the replay scoreboard state corresponding to the source register read is used (e.g. that a load miss subsequent to the corresponding instruction does not cause a replay of that instruction).

The destination register written by the instruction may also be checked against the integer replay scoreboard to detect a WAW dependency (decision block 96). If the destination register is busy in the integer replay scoreboard 44B (decision block 98), a replay may be signaled (block 100). Again, the signaling of replay is delayed to the replay stage if the check is performed prior to the replay stage for the instruction. For example, in one embodiment, the check for destination registers is performed in the Cache stage of the load/store pipeline and in the register file read (RR) stage of the integer pipeline.

Floating Point Scoreboarding and Instruction Issue

Similar to the integer instructions above, floating point instructions may have dependencies on load instructions (in this case, floating point load instructions). Particularly, the source registers of floating point instructions may have a RAW dependency on the destination register of the floating point load. Since the floating point pipelines are skewed to align their register file read (RR) stages with the forwarding of data for a load instruction in the load pipeline, an issue scoreboard for these dependencies is not used (similar to the issuing of integer instructions into the integer pipelines as described above). However, replays may be detected for floating point load misses. Accordingly, the FP RAW Load replay scoreboard 46A and the FP RAW Load graduation scoreboard 46B are used to track floating point load misses. The bit corresponding to the destination register of a floating point load miss is set in the FP RAW Load replay scoreboard 46A in response to the load miss passing the replay stage of the load/store pipeline. The bit corresponding to the destination register of the floating point load miss is set in the FP RAW Load graduation scoreboard 46B in response to the load miss passing the graduation stage of the load/store pipeline. The bit in both scoreboards is cleared in response to the fill data for the floating point load miss being provided.

While most integer instructions in the above described embodiment have a latency of one clock cycle, with forwarding of results to dependent instructions, the floating point instructions in this embodiment may have execution latencies greater than one clock cycle. Particularly, for the present embodiment, the short floating point instructions may have 4 clock cycles of execution latency, the floating point multiply-add instruction may have 8 clock cycles of execution latency, and the long latency floating point instructions may have varying latencies greater than 8 clock cycles. The latencies of any of the above groups of floating point instructions may vary from embodiment to embodiment.

Since the execution latency is greater than one clock cycle, other types of dependencies may be scoreboarded. Particularly, a RAW dependency may exist between a first floating point instruction which updates a destination register used as a source register by a second floating point instruction. The FP EXE RAW issue scoreboard 46C may be used to detect these dependencies. The FP EXE RAW replay scoreboard 46D may be used to recover the FP EXE RAW issue scoreboard 46C in the event of a replay/redirect or exception. The bit corresponding to the destination register of a floating point instruction may be set in the FP EXE RAW issue scoreboard 46C in response to issuing the instruction. The bit corresponding to the destination register of the floating point instruction may be set in the FP EXE RAW replay scoreboard 46D in response to the instruction passing the replay stage. The bit may be cleared in both scoreboards 5 clock cycles before the floating point instruction updates its result. The number of clock cycles may vary in other embodiments. Generally, the number of clock cycles is selected to align the register file read (RR) stage of the dependent instruction with the stage at which result data is forwarded for the prior floating point instruction. The number may depend on the number of pipeline stages between the issue stage and the register file read (RR) stage of the floating point pipeline (including both stages) and the number of stages between the result forwarding stage and the write stage of the floating point pipeline.

As mentioned above, the register file read (RR) stage for the add operand of the floating point multiply-add instruction is skewed with respect to the register file read of the multiply operands. Thus, if issue of a floating point multiply-add instruction is inhibited because of a dependency for the add operand of the floating point multiply-add instruction on a preceding floating point instruction, the floating point multiply-add instruction may be issued earlier in time than for a dependency on other operands. Since the busy state for the add operand of the multiply-add instruction is cleared earlier (with regard to the write of the register by the preceding floating point instruction) than other busy states, a separate scoreboard may be used for the add operand. The FP Madd RAW issue scoreboard 46E may be used for this purpose. The FP Madd RAW replay scoreboard 46F may be used to recover the FP Madd RAW issue scoreboard 46E in the event of a replay/redirect or exception. The bit corresponding to the destination register of a floating point instruction may be set in the FP Madd RAW issue scoreboard 46E in response to issuing the instruction. The bit corresponding to the destination register of the floating point instruction may be set in the FP Madd RAW replay scoreboard 46F in response to the instruction passing the replay stage. The bit may be cleared in both scoreboards 9 clock cycles before the floating point instruction updates its result. The number of clock cycles may vary in other embodiments. Generally, the number of clock cycles is selected to align the register file read (RR) stage for the add operand of the floating point multiply-add instruction with the stage at which result data is forwarded for the prior floating point instruction. The number may depend on the number of pipeline stages between the issue stage and the register file read (RR) stage for the add operand of the floating point multiply-add pipeline (including both stages) and the number of stages between the result forwarding stage and the write stage of the floating point pipeline.

Since the execution latencies of the various floating point instructions may differ, the floating point instructions may also experience WAW dependencies. For example, a long latency floating point instruction updating register F1 followed by a short floating point instruction updating register F1 is a WAW dependency. To allow more overlap of instructions having WAW dependencies than those having a RAW dependency (since the write by the dependent instruction occurs later than a read of the dependent instruction in the pipeline), a separate scoreboard may be used to detect WAW dependencies. The FP EXE WAW issue scoreboard 46G may be used for this purpose. The FP EXE WAW replay scoreboard 46H may be used to recover the FP EXE WAW issue scoreboard 46G in the event of a replay/redirect or exception. The bit corresponding to the destination register of a floating point instruction may be set in the FP EXE WAW issue scoreboard 46G in response to issuing the instruction. The bit corresponding to the destination register of the floating point instruction may be set in the FP EXE WAW replay scoreboard 46H in response to the instruction passing the replay stage. The bit may be cleared in both scoreboards 8 clock cycles before the floating point instruction updates its result. The number of clock cycles may vary in other embodiments. Generally, the number of clock cycles is selected to ensure that the register file write (Wr) stage for the dependent floating point instruction occurs at least one clock cycle after the register file write (Wr) stage of the preceding floating point instruction. In this case, the minimum latency for floating point instructions is 9 clock cycles for the short floating point instructions. Thus, 8 clock cycles prior to the register file write stage ensures that the floating point instructions writes the register file at least one clock cycle after the preceding floating point instruction. The number may depend on the number of pipeline stages between the issue stage and the register file write (Wr) stage for the lowest latency floating point instruction.

The floating point load instruction has a lower latency than other floating point instructions (5 clock cycles from issue to register file write (Wr) in the case of a cache hit). To account for WAW dependencies between a floating point instruction and a subsequent floating point load, the FP Load WAW issue scoreboard 46I may be used and the FP Load WAW replay scoreboard 46J may be used to recover from replay/redirect and exceptions. The bit corresponding to the destination register of a floating point instruction may be set in the FP Load WAW issue scoreboard 46I in response to issuing the instruction. The bit corresponding to the destination register of the floating point instruction may be set in the FP Load WAW replay scoreboard 46J in response to the instruction passing the replay stage. The bit may be cleared in both scoreboards 4 clock cycles before the floating point instruction updates its result. The number of clock cycles may vary in other embodiments. Generally, the number of clock cycles is selected to ensure that the register file write (Wr) stage for the floating point load instruction occurs at least one clock cycle after the register file write (Wr) stage of the preceding floating point instruction. In this case, the minimum latency for floating point load instructions is 5 clock cycles. Thus, 4 clock cycles prior to the register file write stage ensures that the floating point load writes the register file at least one clock cycle after the preceding floating point instruction. The number may depend on the number of pipeline stages between the issue stage and the register file write (Wr) stage for the floating point load instruction.

It is noted that the floating point instructions may have a WAW dependency on a preceding floating point load instruction as well. These scenarios may be handled by checking the FP RAW relay scoreboard 46A for the destination register of the floating point instruction and replaying the floating point instruction if a dependency is detected.

It is noted that other embodiments may employ fewer scoreboards. For example, the FP EXE WAW scoreboards 46G and 46H may be eliminated and the FP Load WAW scoreboards 46I and 46J may be checked instead for detecting WAW dependencies for floating point instructions (and less overlap between floating point instructions and the floating point load instructions which depend on those floating point instructions). Similarly, FP EXE RAW scoreboards 46C and 46D may be eliminated and one or both of the FP Load WAW scoreboards 46I and 46J or the FP EXE WAW scoreboards 46G and 46H may be used. The FP Madd RAW scoreboards 46E and 46F may be eliminated and the FP EXE RAW scoreboards 46C and 46D may be used.

FIGS. 10-14 are flowcharts illustrating the operation of one embodiment of the issue control circuit 42 for the floating point scoreboards and floating point instruction issue. Generally, the circuitry represented by FIGS. 10-14 may determine which pipe stage an instruction is in by examining the pipe state in the corresponding entry of the issue queue 40. Viewed in another way, the circuitry represented by a given decision block may decode the type field in each entry and the corresponding pipe state to detect if an instruction in any issue queue entry is an instruction in the pipe stage searched for by that decision block. The circuitry may also include the indications provided by the execution units and/or the data cache (e.g. the miss indications and fill indications from the data cache 30).

Figure 10:
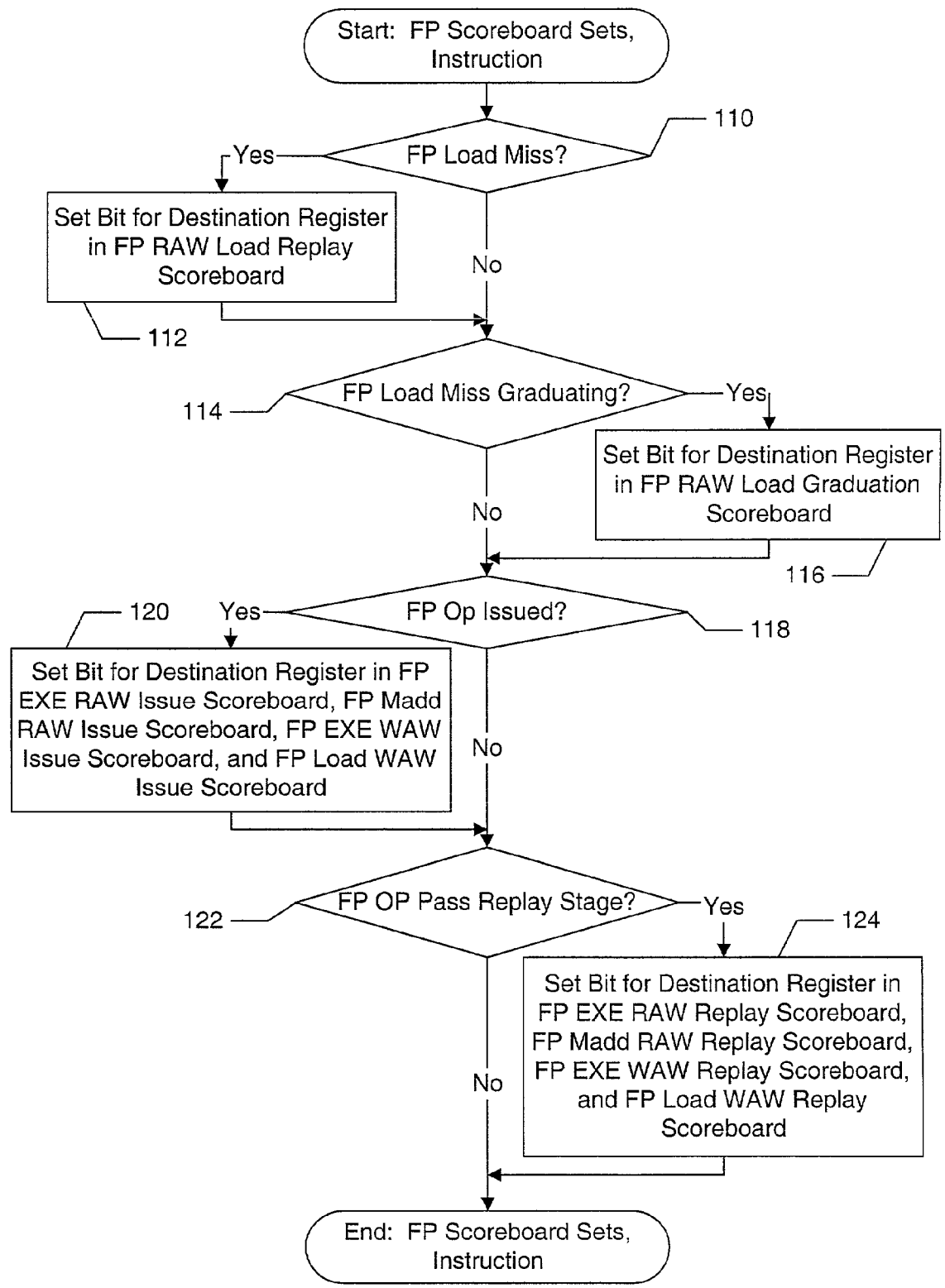
FIG. 10 is a flowchart illustrating one embodiment of the setting of bits in the floating point scoreboards shown in FIG. 5 in response to individual instructions.

Turning now to FIG. 10, a flowchart is shown representing operation of one embodiment of circuitry in the issue control circuit 42 for setting bits in the floating point scoreboards 46 in response to individual instructions being processed. Other embodiments are possible and contemplated. While the blocks shown in FIG. 10 are illustrated in a particular order for ease of understanding, any order may be used. Furthermore, some blocks may represent independent circuitry operating in parallel with other circuitry. Specifically, in FIG. 10, each decision block may represent independent and parallel circuitry.

If a floating point load instruction is a miss (decision block 110), the issue control circuit 42 sets the bit for the destination register of the floating point load in the FP RAW Load replay scoreboard 46A (block 112). If a floating point load miss is passing the graduation stage (decision block 114), the issue control circuit 42 sets the bit for the destination register of the floating point load in the FP RAW Load graduation scoreboard 46B (block 116). In response to issuing a floating point instruction into one of the floating point pipelines (decision block 118), the issue control circuit 42 sets the bit for the destination register of the floating point instruction in each of the FP EXE RAW issue scoreboard 46C, the FP Madd RAW issue scoreboard 46E, the FP EXE WAW issue scoreboard 46G, and the FP Load WAW issue scoreboard 46I (block 120). Similarly, in response to a floating point instruction passing the replay stage (decision block 122), the issue control circuit 42 sets the bit for the destination register of the floating point instruction in each of the FP EXE RAW replay scoreboard 46D, the FP Madd RAW replay scoreboard 46F, the FP EXE WAW replay scoreboard 46H, and the FP Load WAW replay scoreboard 46J (block 124).

It is noted that, for embodiments employing the pipeline shown in FIG. 3, the short floating point instructions are eight clock cycles away from the Wr stage at issue. Accordingly, in such embodiments, the issue control circuit 42 may not set bits in the FP EXE WAW issue and replay scoreboards 46G-46H or the FP Madd RAW issue and replay scoreboards 46E-46F in blocks 120 and 124 for short floating point instructions.

Figure 11:
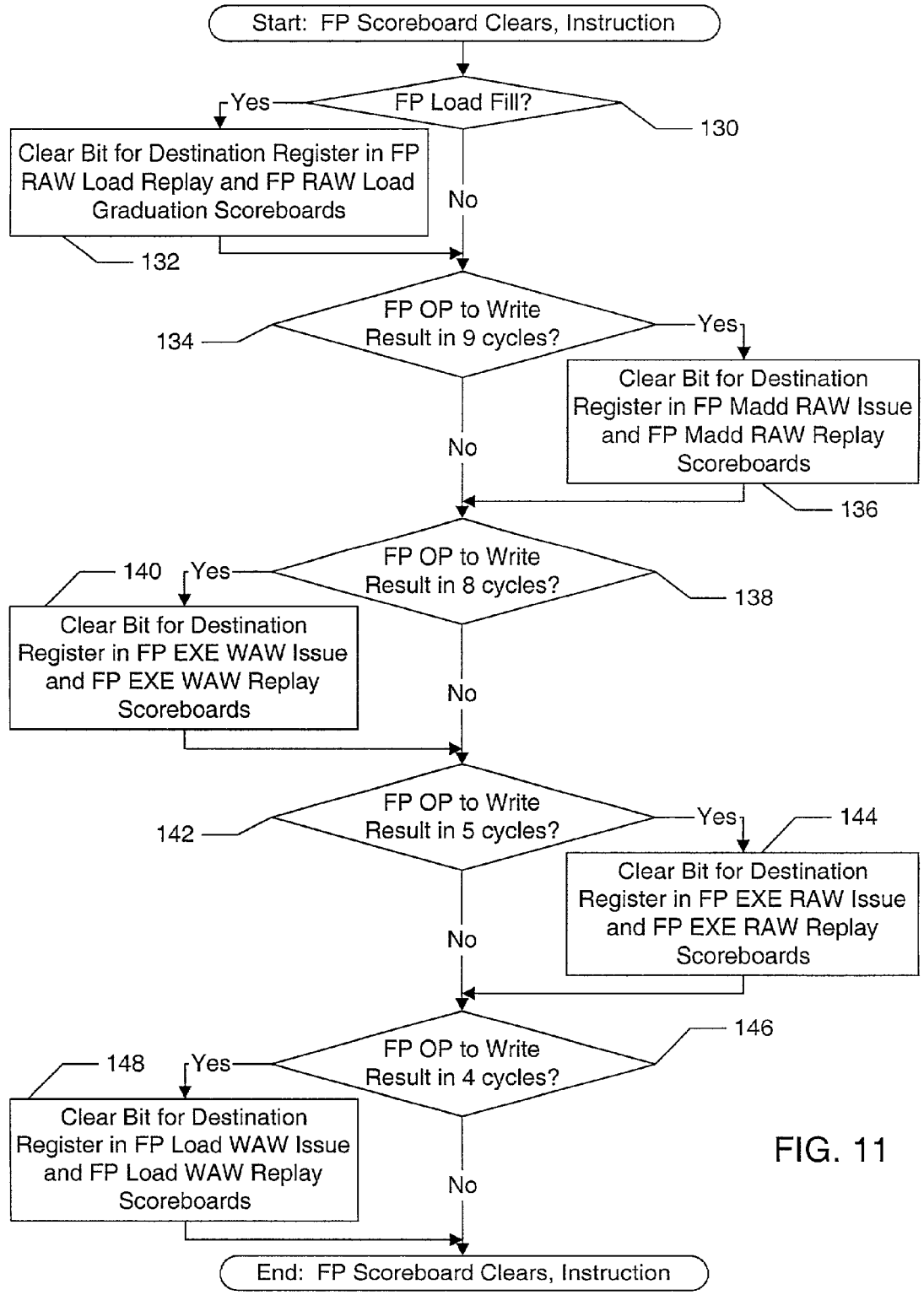
FIG. 11 is a flowchart illustrating one embodiment of the clearing of bits in the floating point scoreboards shown in FIG. 5 in response to individual instructions.

Turning now to FIG. 11, a flowchart is shown representing operation of one embodiment of circuitry in the issue control circuit 42 for clearing bits in the floating point scoreboards 46 in response to individual instructions being processed. Other embodiments are possible and contemplated. While the blocks shown in FIG. 11 are illustrated in a particular order for ease of understanding, any order may be used. Furthermore, some blocks may represent independent circuitry operating in parallel with other circuitry. Specifically, in FIG. 11, each decision block may represent independent and parallel circuitry.

In response to floating point fill data being provided (decision block 130), the issue control circuit 42 clears the bit for the destination register of the corresponding floating point load in the FP RAW Load replay and graduation scoreboards 46A-46B (block 132). The fill may be linked to a particular floating point load in any fashion, similar to the description above for fills and integer load instructions.

The remaining events which cause bits to be cleared in the floating point scoreboards are timed from the corresponding instruction reaching the pipeline stage at which the instruction writes its result to the register file. As mentioned above, the specific numbers used are based on the pipeline illustrated in FIG. 3, and the numbers may vary from embodiment to embodiment. For simplicity in this discussion, the specific numbers are used. For the short floating point instructions and the floating point multiply-add instruction, the issue control circuit 42 may determine the stage at which the instruction will write its result internally using the pipe state, and thus may determine the intervals mentioned below internally as well. For the long latency floating point instructions, the issue control circuit 42 may rely on receiving the op cmpl indication for the instruction. The floating point execution units 24A-24B may provide these indications for long latency floating point instructions in time to allow the issue control circuit 42 to calculate the intervals. Thus, the indication may be at least the number of clock cycles before the register file write as the earliest of the conditions checked for (e.g. 9 clock cycles before, in this embodiment).

In response to a floating point instruction in the pipeline being 9 clock cycles away from the register file write (Wr) stage (decision block 134), the issue control circuit 42 clears the bit for the destination register of the floating point instruction in the FP Madd RAW issue and replay scoreboards 46E and 46F (block 136). In response to a floating point instruction in the pipeline being 8 clock cycles away from the register file write (Wr) stage (decision block 138), the issue control circuit 42 clears the bit for the destination register of the floating point instruction in the FP EXE WAW issue and replay scoreboards 46G and 46H (block 140). In response to a floating point instruction in the pipeline being 5 clock cycles away from the register file write (Wr) stage (decision block 142), the issue control circuit 42 clears the bit for the destination register of the floating point instruction in the FP EXE RAW issue and replay scoreboards 46C and 46D (block 144). In response to a floating point instruction in the pipeline being 4 clock cycles away from the register file write (Wr) stage (decision block 146), the issue control circuit 42 clears the bit for the destination register of the floating point instruction in the FP Load WAW issue and replay scoreboards 46I and 46J (block 148).

Examples of each of the above clearings of scoreboards and the corresponding issuance of a dependent instruction are shown in FIGS. 15-18 and are discussed below.

Figure 12:
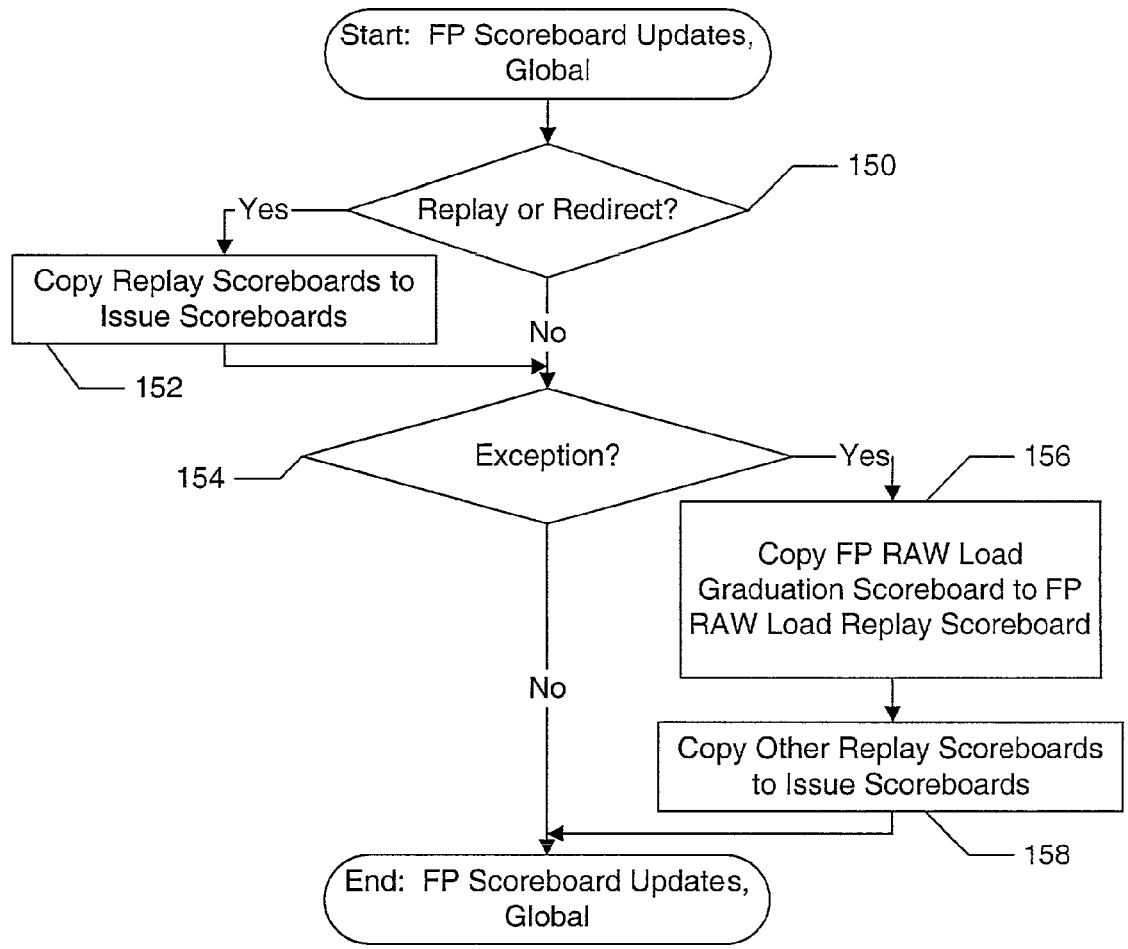
FIG. 12 is a flowchart illustrating one embodiment of global updates to the floating point scoreboards shown in FIG. 5 due to replays, redirects, or exceptions.

Turning next to FIG. 12, a flowchart is shown representing operation of one embodiment of circuitry in the issue control circuit 42 for updating the floating point scoreboards 46 in a global sense (e.g. each scoreboard bit is updated) in response to various events detected by the issue control circuit 42 or the execution units 22A-22B, 24A-24B, and 26A-26B. Other embodiments are possible and contemplated. While the blocks shown in FIG. 12 are illustrated in a particular order for ease of understanding, any order may be used. Furthermore, some blocks may represent independent circuitry operating in parallel with other circuitry. Specifically, in FIG. 12, each decision block may represent independent and parallel circuitry.

If a replay is detected by the issue control circuit 42 or if a redirect is signaled by the integer execution unit 22A (decision block 150), the issue control circuit 42 copies the contents of each of the replay scoreboards 46D, 46F, 46H, and 46J to the corresponding issue scoreboards 46C, 46E, 46G, and 46I (block 152). If an exception is detected by an execution unit 22A-22B, 24A-24B, or 26A-26B (decision block 154), the issue control circuit 42 copies the contents of the FP RAW Load graduation scoreboard 46B to the FP RAW Load replay scoreboard 46A (block 156). Additionally, the contents of the replay scoreboards 46D, 46F, 46H, and 46J may be copied to the corresponding issue scoreboards 46C, 46E, 46G, and 46I (block 158). In one embodiment, to account for the instructions which are between the replay stage and graduation when an exception is signaled, the copying of replay scoreboards to issue scoreboards may be delayed until these instructions exit the pipeline (and thus their effects are deleted from the replay scoreboards).

It is noted that, in another embodiment, the issue control circuit 42 may delay subsequent instruction issue after an exception is signalled until any previously issued long latency floating point instructions have completed in the floating point execution units 24A-24B. Once the long latency floating point instructions have completed, the issue control circuit 42 may clear the replay scoreboards (since no instructions that have passed the replay stage are in the floating point pipelines) and may copy the cleared replay scoreboards over the corresponding issue scoreboards (thus clearing the issue scoreboards as well). The clearing of the replay scoreboards may be the natural result of the instructions completing, or the issue control circuit 42 and/or the replay scoreboards may include circuitry to perform the clearing. Alternatively, the issue control circuit 42 may clear both the issue and the replay scoreboards and may not copy the replay scoreboards over the issue scoreboards.

It is noted that the copying of the contents of one scoreboard to another may be delayed by one or more clock cycles from the detection of the corresponding event (e.g. the detection of replay/redirect or exception).

Figure 13:
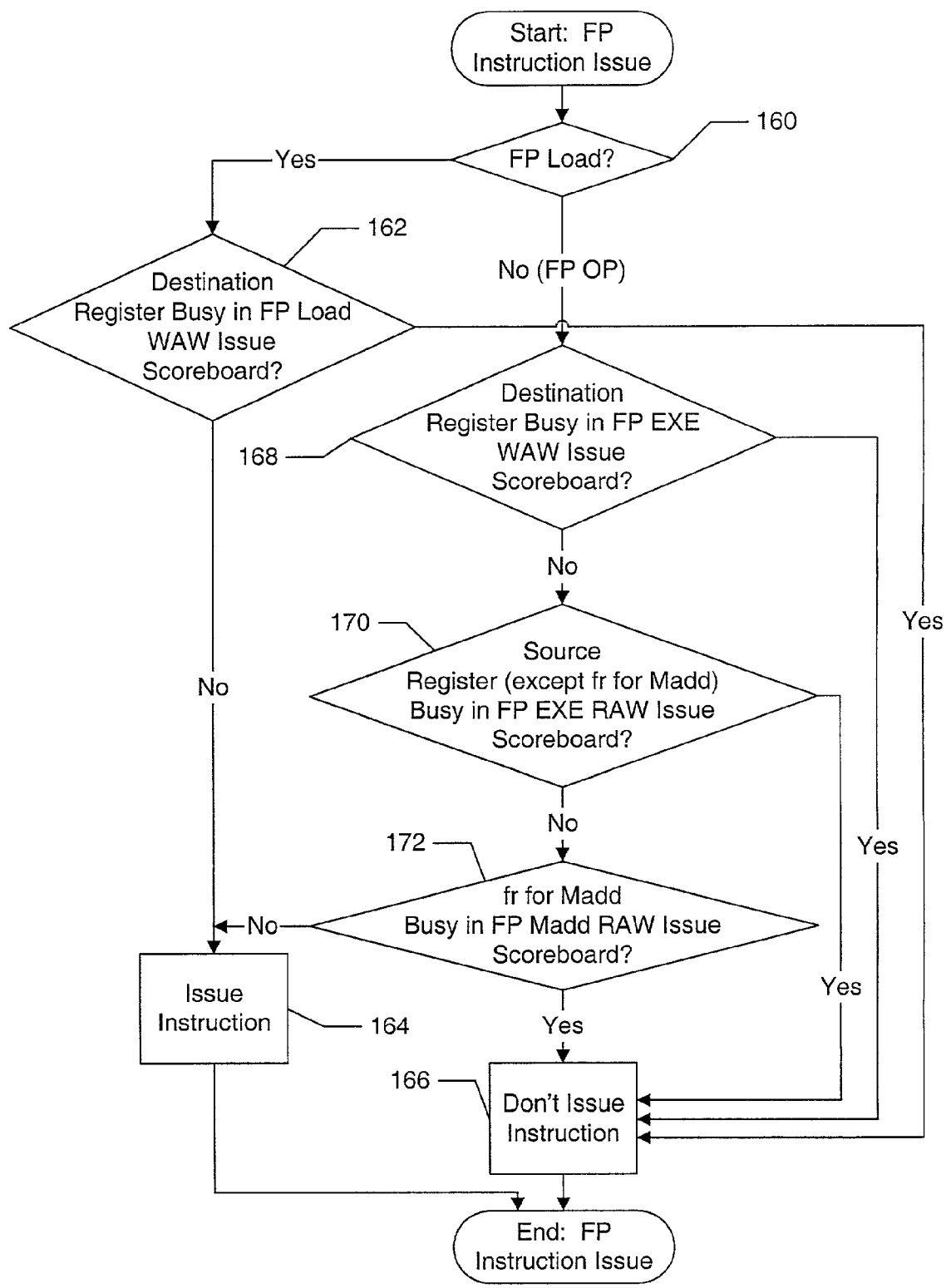
FIG. 13 is a flowchart illustrating one embodiment of issue of floating point instructions.

Turning now to FIG. 13, a flowchart is shown representing operation of one embodiment of circuitry in the issue control circuit 42 for determining if a floating point instruction or a floating point load instruction is eligible for issue. Other embodiments are possible and contemplated. While the blocks shown in FIG. 13 are illustrated in a particular order for ease of understanding, any order may be used. Furthermore, some blocks may represent independent circuitry operating in parallel with other circuitry. Particularly, decision blocks 162, 168, 170, and 172 may each represent circuitry independent of and operating in parallel with the others. FIG. 13 may represent the circuitry for considering one instruction in one issue queue entry for issue. Similar circuitry may be provided for each issue queue entry, or for a number of issue queue entries at the head of the queue (e.g. for in order embodiments, the number of issue queue entries from which instructions may be issued may be less than the total number of issue queue entries). FIG. 13 illustrates detecting if a floating point instruction is eligible for issue based on dependencies indicated by the scoreboards. Other issue constraints (e.g. prior instructions in program order issuable to the same pipeline, etc.) may vary from embodiment to embodiment and may affect whether or not the instruction is actually issued.

If the instruction is a floating point load instruction (decision block 160), the issue control circuit 42 checks the destination register of the load against the FP Load WAW issue scoreboard 46I (decision block 162). If the register is not indicated as busy, the instruction may be issued (block 164). If the register is indicated as busy, the instruction may not be issued (block 166).

If the instruction is not a floating point load instruction (decision block 160), the instruction is a floating point instruction to be issued to the floating point pipelines. For these instructions, the issue control circuit 42 may check the destination register of the instruction against the FP EXE WAW issue scoreboard 46G (decision block 168). If the destination register is busy in the FP EXE WAW issue scoreboard 46G, the instruction is not issued (block 166). Additionally, the issue control circuit 42 may check the source registers of the floating point instruction (except the add source operand for the floating point multiply-add instruction, denoted "fr" in FIG. 13) against the FP EXE RAW issue scoreboard 46C (decision block 170). If one of the source registers is indicated as busy in the FP EXE RAW issue scoreboard 46C, the instruction is not issued (block 166). Still further, if the instruction is a floating point multiply-add instruction, the add source operand is checked against the FP Madd RAW issue scoreboard 46E (decision block 172). If the add source operand register is indicated as busy in the FP Madd RAW issue scoreboard, the instruction is not issued (block 166). If each of the checks represented by decision blocks 168, 170, and 172 indicate not busy, the instruction may be issued (block 164).

Figure 14:
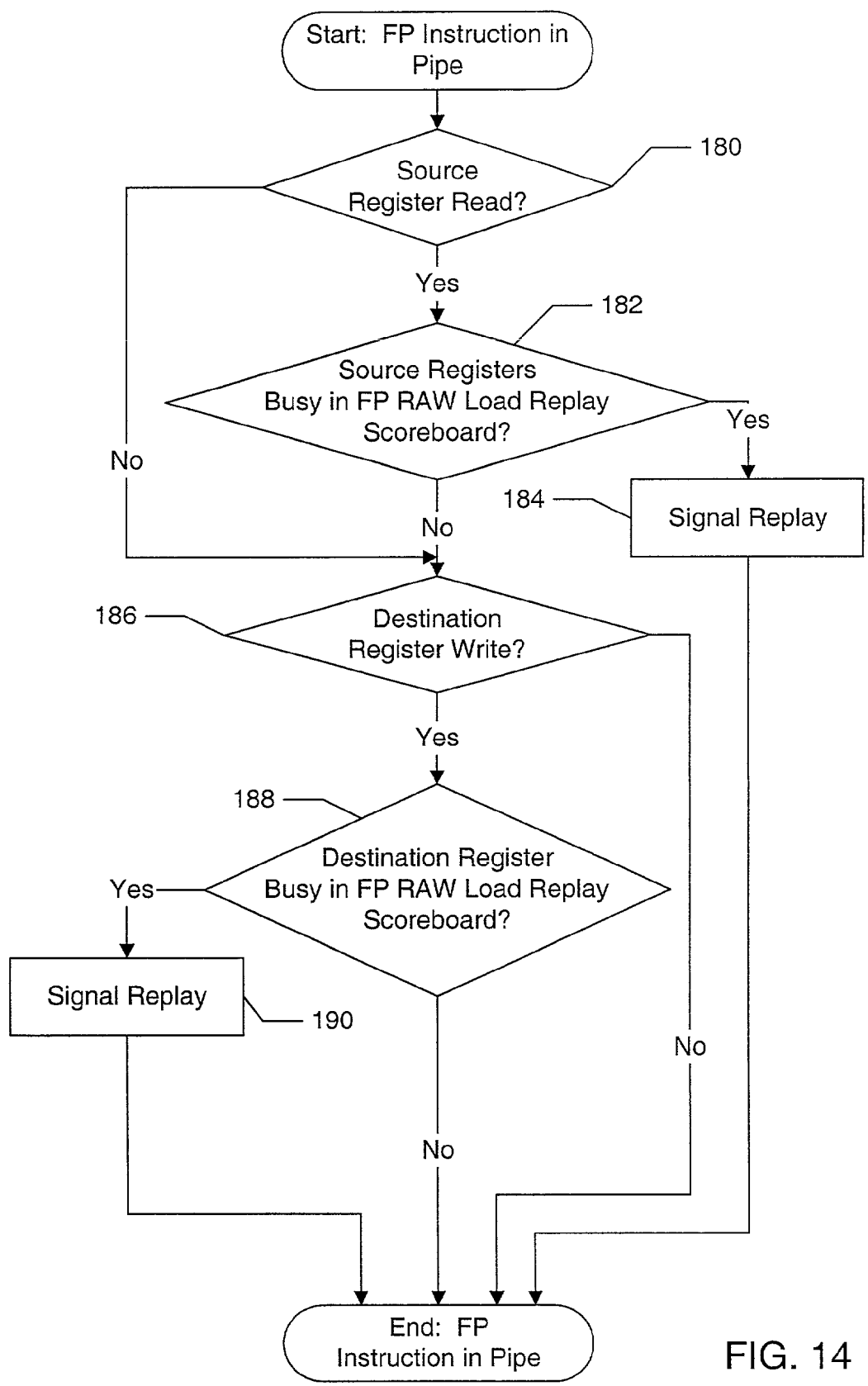
FIG. 14 is a flowchart illustrating operation of one embodiment of floating point instructions in the pipelines of the processor.

Turning now to FIG. 14, a flowchart is shown representing operation of one embodiment of circuitry in the issue control circuit 42 for detecting replay scenarios for a floating point instruction. Other embodiments are possible and contemplated. While the blocks shown in FIG. 14 are illustrated in a particular order for ease of understanding, any order may be used. Furthermore, some blocks may represent independent circuitry operating in parallel with other circuitry. Specifically, decision blocks 180 and 182 may represent independent circuitry from decision blocks 186 and 188. FIG. 14 may represent the circuitry for considering one instruction in one issue queue entry for detecting replay. Similar circuitry may be provided for each issue queue entry, or for a number of issue queue entries at the head of the queue, as desired.

For each source register read (decision block 180), the issue control circuit 42 may check the FP RAW Load replay scoreboard 46A to determine if the source register is busy (decision block 182). If the source register is busy in the FP RAW Load replay scoreboard 46A, then the floating point instruction is to be replayed due to a RAW dependency on that source register (block 184). The actual assertion of the replay signal is delayed until the instruction reaches the replay stage, if the check is done prior to the replay stage. For example, in one embodiment, the check for source registers is performed in the register file read (RR) stage of the floating point pipeline. In such an embodiment, the check may also include detecting a concurrent miss in the load/store pipeline for a floating point load having the source register as a destination (since such misses may not yet be recorded in the FP RAW Load replay scoreboard 46A).

The destination register written by the instruction may also be checked against the FP RAW Load replay scoreboard 46A to detect a WAW dependency (decision block 186). If the destination register is busy in the FP RAW Load replay scoreboard 46A (decision block 188), a replay may be signaled (block 190). Again, the signaling of replay is delayed to the replay stage if the check is performed prior to the replay stage for the instruction.

Figure 15:
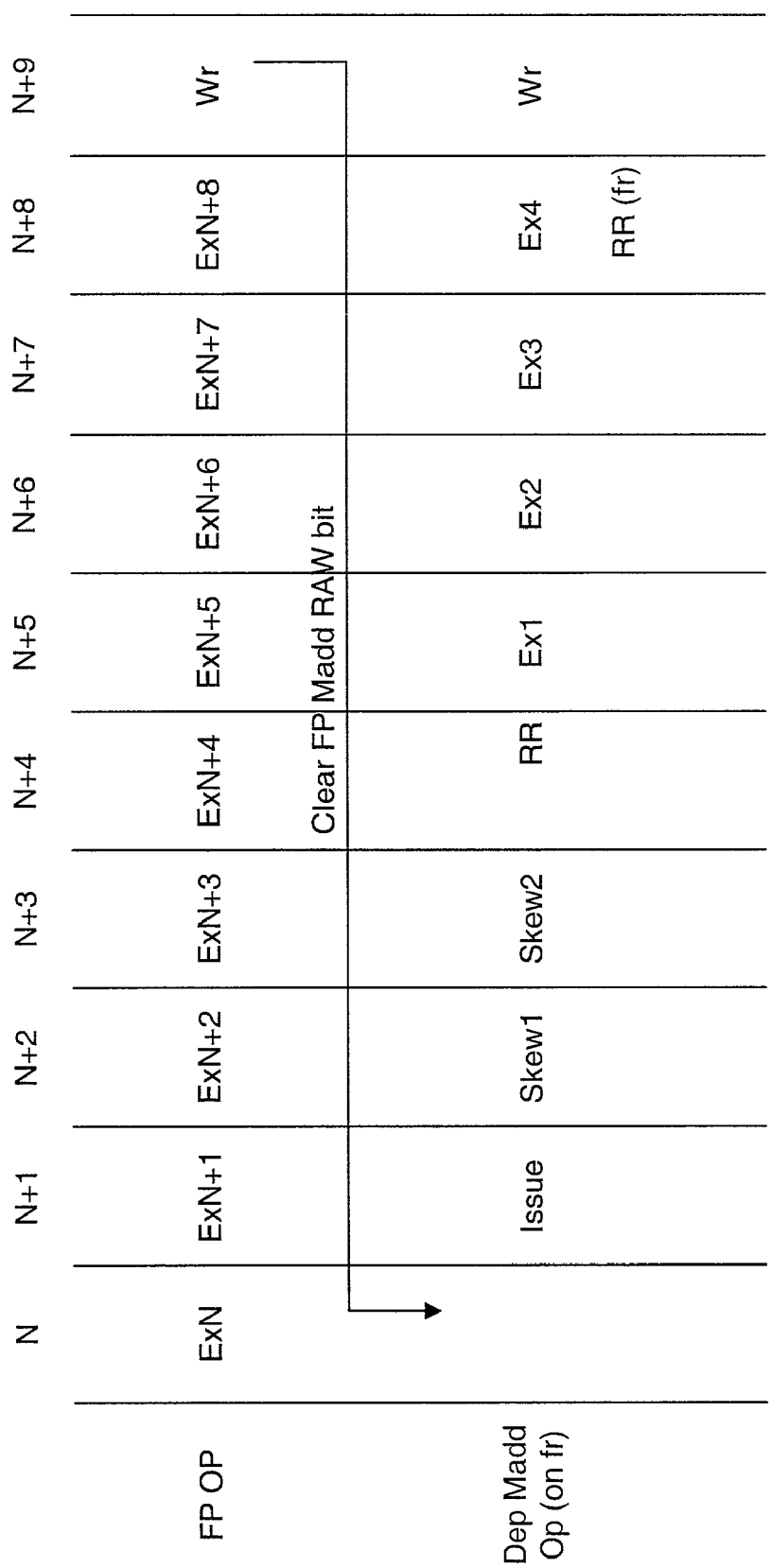
FIG. 15 is a timing diagram illustrating a first example of floating point instruction processing.
Figure 16:
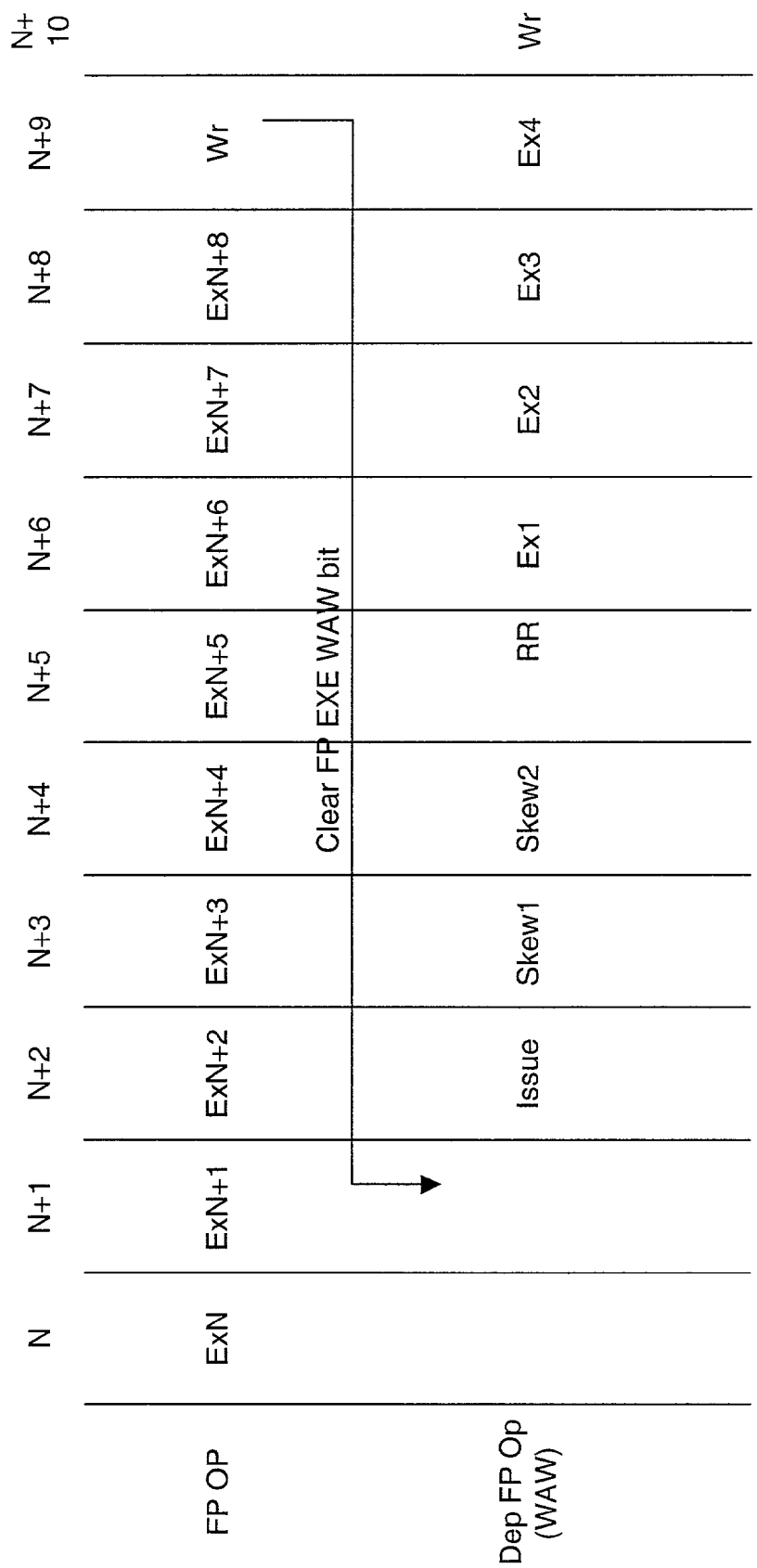
FIG. 16 is a timing diagram illustrating a second example of floating point instruction processing.
Figure 17:
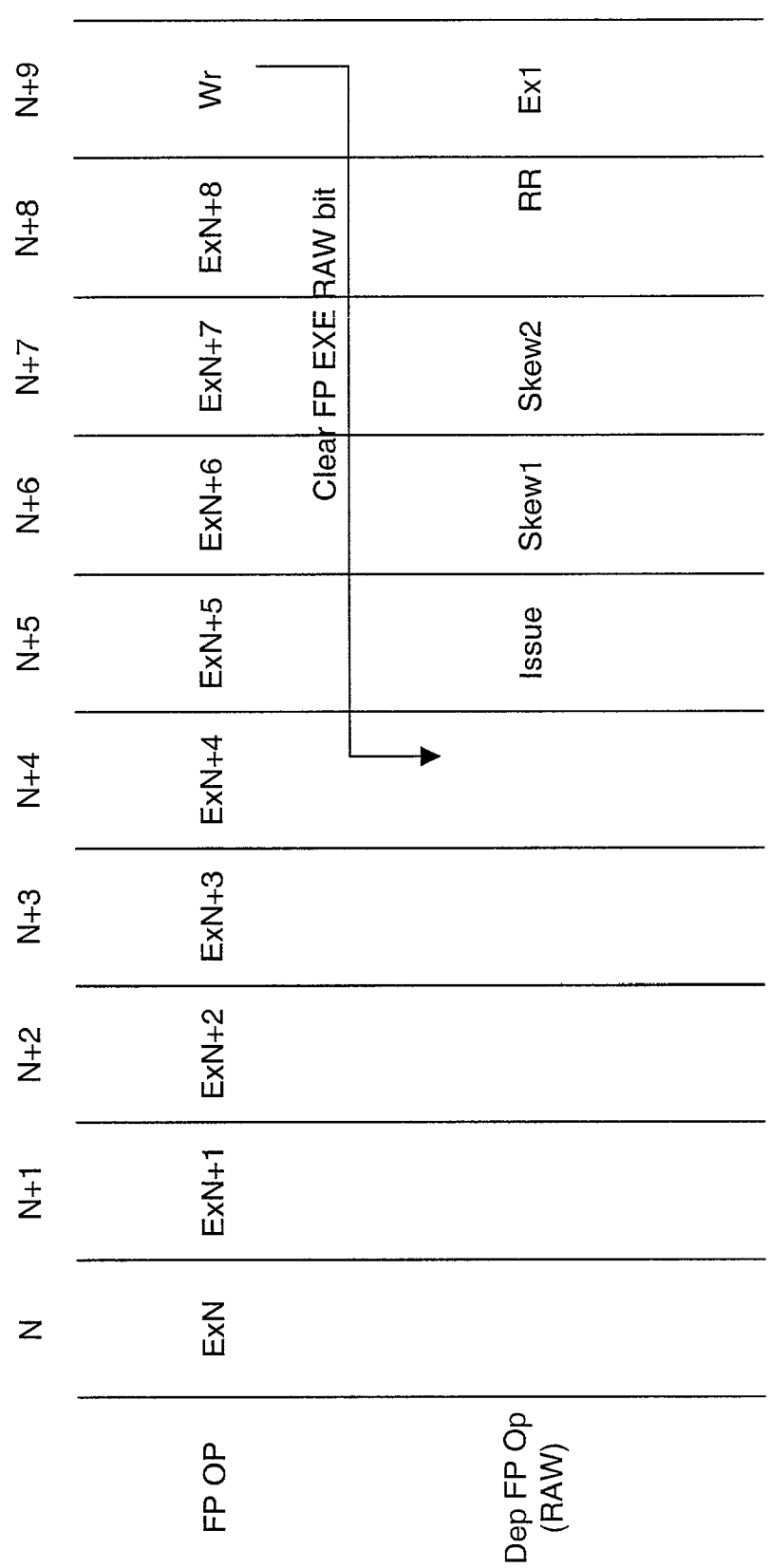
FIG. 17 is a timing diagram illustrating a third example of floating point instruction processing.
Figure 18:
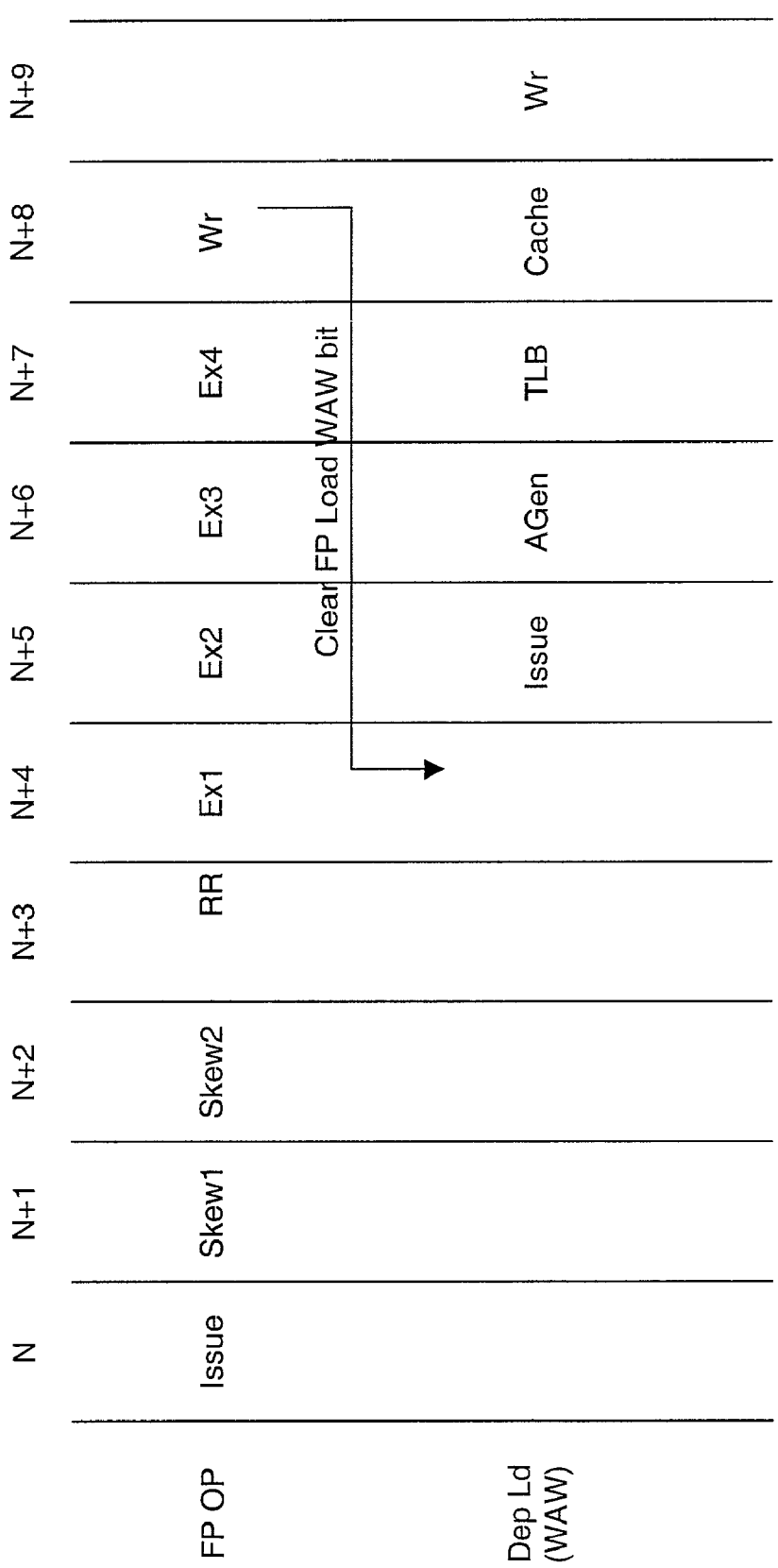
FIG. 18 is a timing diagram illustrating a fourth example of floating point instruction processing.

FIGS. 15-18 are timing diagrams illustrating examples of the overlap of a floating point instruction (FP OP in each diagram) and a dependent instruction (Dep Madd Op in FIG. 15, Dep FP Op (WAW) in FIG. 16, Dep FP OP (RAW) in FIG. 17, and Dep Ld (WAW) in FIG. 18). In each timing diagram, several clock cycles are shown delimited by vertical dashed lines. The clock cycles are labeled N through N+9 in each diagram (and N+10 in FIG. 16). The pipeline stages that each instruction is in for each clock cycle are illustrated horizontally from the corresponding label. Additionally, the clearing of the bit in the corresponding scoreboard is illustrated by an arrow from the FP OP to the clock cycle before issuance of the dependent instruction. In each example, it is assumed that the illustrated dependency is the last issue constraint preventing issue of the dependent instruction.

FIG. 15 is an example of a long latency floating point instruction and a dependent floating point multiply-add instruction, where the dependency exists on the add operand register (denoted "fr" in FIG. 15). The FP OP passes through execution stages ExN to ExN+8 in clock cycles N to N+8 in FIG. 15. In clock cycle N+9, the FP OP reaches the register file write (Wr) stage. Nine clock cycles prior to the FP OP reaching the Wr stage, the bit corresponding to the destination register of the FP OP is cleared in the FP Madd RAW issue scoreboard 46E (and the corresponding replay scoreboard 46F). That is, the clearing of the bit in the FP Madd RAW issue scoreboard 46E occurs in clock cycle N. Thus, the floating point multiply-add is issued in clock cycle N+1. The floating point multiply-add instruction progresses through the pipeline, reaching the register file read stage for the add operand register (RR(fr)) at clock cycle N+8. The FP OP forwards its result in clock cycle N+8, thus supplying the add operand to the floating point multiply-add instruction.

FIG. 16 is an example of a long latency floating point instruction FP OP and a dependent floating point instruction (Dep FP Op), where the dependency is a WAW dependency (that is, the FP OP and the Dep FP Op update the same destination register). The FP OP passes through execution stages ExN to ExN+8 in clock cycles N to N+8 in FIG. 16. In clock cycle N+9, the FP OP reaches the register file write (Wr) stage. Eight clock cycles prior to the FP OP reaching the Wr stage, the bit corresponding to the destination register of the FP OP is cleared in the FP EXE WAW issue scoreboard 46G (and the corresponding replay scoreboard 46H). That is, the clearing of the bit in the FP EXE WAW issue scoreboard 46G occurs in clock cycle N+1. Thus, the Dep FP Op is issued in clock cycle N+2. The Dep FP Op progresses through the pipeline, reaching the register file write stage (Wr) at clock cycle N+10. Accordingly, the Dep FP Op updates the register file one clock cycle after the FP OP.

FIG. 17 is an example of a long latency floating point instruction FP OP and a dependent floating point instruction (Dep FP Op), where the dependency is a RAW dependency (that is, the FP OP has a destination register which is the same as a source register of the Dep FP Op). The FP OP passes through execution stages ExN to ExN+8 in clock cycles N to N+8 in FIG. 17. In clock cycle N+9, the FP OP reaches the register file write (Wr) stage. Five clock cycles prior to the FP OP reaching the Wr stage, the bit corresponding to the destination register of the FP OP is cleared in the FP EXE RAW issue scoreboard 46C (and the corresponding replay scoreboard 46D). That is, the clearing of the bit in the FP EXE RAW issue scoreboard 46C occurs in clock cycle N+4. Thus, the Dep FP Op is issued in clock cycle N+5. The Dep FP Op progresses through the pipeline, reaching the register file read stage (RR) at clock cycle N+8. The FP OP forwards its result in clock cycle N+8, thus supplying the source operand to the Dep FP Op (which begins execution in clock cycle N+9).

FIG. 18 is an example of a short floating point instruction FP OP and a dependent floating point load instruction (Dep Ld), where the dependency is a WAW dependency (that is, the FP OP and the Dep Ld have the same destination register). The FP OP is issued in clock cycle N and passes through the stages of the short FP pipeline to reach the register file write (Wr) stage in clock cycle N+8. Four clock cycles prior to the FP OP reaching the Wr stage, the bit corresponding to the destination register of the FP OP is cleared in the FP Load WAW issue scoreboard 46I (and the corresponding replay scoreboard 46J). That is, the clearing of the bit in the FP Load WAW issue scoreboard 46I occurs in clock cycle N+4. Thus, the Dep FP Ld is issued in clock cycle N+5. The Dep FP Op progresses through the pipeline, reaching the register file write stage (Wr) at clock cycle N+9. Accordingly, the Dep FP Ld updates the register file one clock cycle after the FP OP.

Power Saving Technique

As mentioned above, a load miss may result in a large number of clock cycles of delay before the fill data is returned. While waiting for the fill data, one or more instructions dependent on the load may be issued to the integer and/or floating point pipelines and may be replayed. Since the replay scoreboards are copied to the issue scoreboards in the event of replay, the issue scoreboards are updated with registers indicated as busy in the replay scoreboard. This update prevents issue of integer instructions to the load/store pipeline (since the integer issue scoreboard is checked for issuing integer instructions to the load/store pipeline). However, integer instructions may be issued to the integer pipelines (since the integer issue scoreboard is not checked for issuing instructions to the integer pipelines) and floating point instructions may be issued to the floating point pipelines (since the load miss is tracked in replay and graduation scoreboards but not an issue scoreboard). If these instructions are dependent on the load miss, then they may be replayed repeatedly until the fill data is returned. Power is wasted in these cases via the repeated attempts to execute the dependent instructions.

In one embodiment, the issue control circuit 42 may implement a technique for power savings if replays are occurring due to dependencies on load misses in the data cache 30. Generally, the issue control circuit 42 may detect if a replay is occurring due to a load miss, and may inhibit issue of instructions if replay is occurring due to the load miss until fill data is returned. Other causes of replay may be included in various embodiments. For example, as mentioned above, one embodiment of the processor 10 uses more than one execute cycle to perform integer multiplies (e.g. two clock cycles may be used). In such an embodiment, the integer multiply may be tracked in the integer scoreboards 44. In other embodiments, the only cause of replay may be the dependency on the load miss and thus the detection of a replay may cause the inhibiting of instruction issue. The detection of fill data being returned may be a signal from the data cache 30 or the source of the fill data (e.g. the bus interface unit 32) that fill data is being provided. In this case, the signal is not specific to the particular load miss that caused the repeated replay. The fill data may actually be for another load miss. In such an embodiment, replay may be detected again after issuing instructions in response to the fill signal. Instruction issue may then again be inhibited until fill data is returned. In other embodiments, a tag identifying the load miss causing the replay may be used to identify the fill data corresponding to the load miss.

Figure 19:
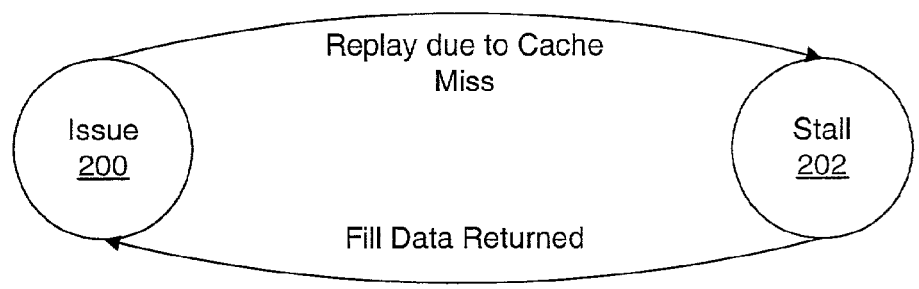
FIG. 19 is a state machine diagram illustrating one embodiment of a power saving technique.

Turning now to FIG. 19, a state machine diagram illustrating a state machine that may be used by one embodiment of the issue control circuit 42 for controlling the issuing of instructions and for implementing one embodiment of the power saving technique is shown. Other embodiments are possible and contemplated. In the embodiment of FIG. 19, the state machine includes an issue state 200 and a stall state 202.

In the issue state 200, the issue control circuit 42 may apply various issue constraints to the instructions in the issue queue 40 which have not been issued, and may select instructions for issue which meet the issue constraints. For example, in one embodiment, the issue control circuit 42 may apply the issue constraints illustrated in FIGS. 8 and 13 to instructions while in the issue state 42. In the stall state 202, the issue control circuit 42 may inhibit any instruction issue.

The issue control circuit 42 may remain in the issue state 200 unless a replay is detected due to a cache miss (that is, a replay is detected due to an outstanding write to a destination register of a load which misses in the data cache 30). Responsive to detecting a replay due to a cache miss, the issue control circuit 42 transitions to the stall state 202 and inhibits instruction issue. The issue control circuit 42 may remain in the stall state 202 until fill data is returned.

The issue control circuit 42 may transition from the stall state 202 to the issue state 200 in response to detecting fill data being returned.

Figure 20:
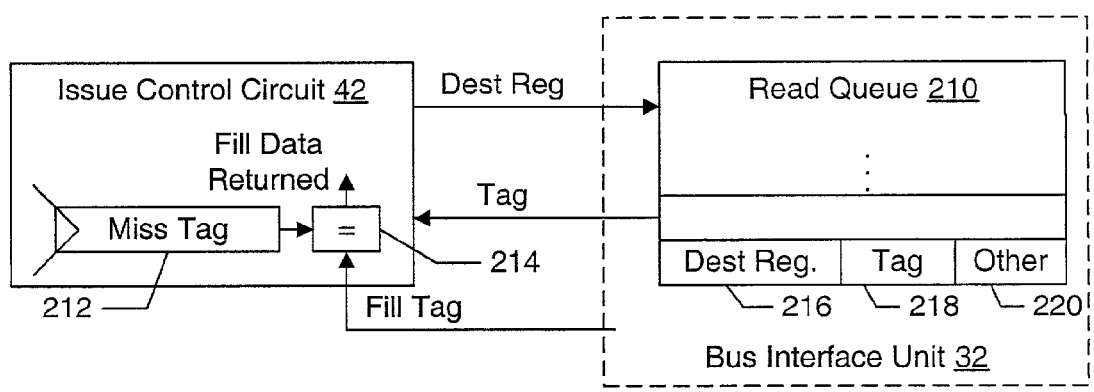
FIG. 20 is a block diagram of circuitry which may be used for one embodiment of the power saving technique.

FIG. 20 is a block diagram illustrating one embodiment of the issue control circuit 42 and a read queue 210. Other embodiments are possible and contemplated. In the embodiment of FIG. 20, the read queue 210 is illustrated in the bus interface unit 32, although other embodiments may locate the read queue 210 anywhere in processor 10 (e.g. load/store units 26A-26B, the data cache 30, etc.). The issue control circuit 42 in FIG. 20 includes a miss tag register 212, a comparator 214 coupled to the miss tag register 212 and coupled to receive a fill tag (e.g. from the bus interface unit 32 or another unit, as desired). The output of the comparator 214 indicates that fill data is being returned (e.g. a transition from the stall state 202 to the issue state 200 may be performed). The issue control circuit 42 is coupled to provide a destination register number to the read queue 210, which is coupled to return a tag to the issue control circuit 42.

The read queue 210 is a queue for storing addresses and other information for cache misses from the data cache 30 (and from the instruction cache 12 as well, in one embodiment). Each entry may result in a read transaction on the bus interface (or other interconnect to which the processor 10 may be configured to couple) initiated by the bus interface unit 32. The read transaction results in a return of a cache block of data to the processor 10 for storage in the data cache 30 or the instruction cache 12.

Generally, the read queue 210 comprises a plurality of entries, each entry capable of storing information for a cache miss. The fields of one entry are illustrated in FIG. 20 and include the destination register number field 216 storing the destination register number (used for load misses), a tag field 218 storing a tag for the entry, and an other field 220 storing other information. The other field may store any desired information in various embodiments, including the address of the cache block to be read from memory, the location of the data being read by the load within the cache block for load misses, etc.

In response to the fill data being returned for a read transaction corresponding to a given entry in the read queue 210, the read queue 210 may supply the destination register number from the entry to the register file 28. Additionally, the data accessed by the load may be selected from the returned cache block and provided to the register file 28 for storage in the destination register. The destination register field 216 in each entry may also be compared to a destination register number supplied by the issue control circuit 42 as described below, to read the tag from the tag field 218 of the corresponding entry.

The tag field 218 stores a tag which identifies the fill corresponding to the cache miss represented in that entry. The tag may be any sort of tag. In one embodiment, the tag may be a transaction identifier assigned to the read transaction initiated by the bus interface unit 32 when the read transaction is initiated. The tag may also be a tag assigned to the read queue entry or identifying the read queue entry. In such an embodiment, the tag may be inherent in the entry and thus may not be explicitly stored in the entry. The tag could also be a tag assigned to the load instruction by the issue control circuit 42 (e.g. a tag identifying the issue queue entry storing the load instruction or a tag indicating the sequence of the load instruction in the outstanding instructions within the pipeline).

The embodiment of FIG. 20 supports the specific identification of a load miss which caused the replay of dependent instructions. The issue control circuit 42, in response to detecting a replay for a load miss, transmits the destination register number of the load miss to the read queue 210 to read the tag corresponding to the entry having that destination register number. The destination register number may include a bit distinguishing floating point registers from integer registers, or a separate signal may be supplied indicating whether the register number is an integer or floating point register (and a separate indication of the type of register may be stored in the destination register field 216 or the other field 220).

In response to the read request with the destination register number from the issue control circuit 42, the read queue 210 may compare the destination register numbers to the destination register numbers in the destination register fields 216 of each entry and may return the tag from the tag field 218 of the entry storing a matching destination register number. The issue control circuit 42 may store the tag in the miss tag register 212.

If a valid tag is stored in the miss tag register 212 (e.g. if the issue control circuit 42 is in the stall state 202), the issue control circuit 42 may monitor a fill tag provided by the bus interface unit 32 for a match with the miss tag stored in the miss tag register 212. The bus interface unit 32 may transmit the fill tag with the fill data to be stored in the data cache 30, and the comparator 214 may also receive the fill tag. The fill tag is the tag from the tag field 218 of the entry of the read queue 210 for which fill data is being provided. If the fill tag matches the miss tag, the issue control circuit 42 detects that fill data is being returned and may transition from the stall state 202 to the issue state 200.

Floating Point Exception Handling

Floating point instructions may be defined to generate exceptions during execution (e.g. for overflow, underflow, generation of not-a-number results, etc.). In one embodiment, the exceptions may include those specified in the Institute for Electrical and Electronic Engineers (IEEE) standard 754 for floating point arithmetic. In one specific embodiment, the exceptions may be those defined by the MIPS instruction set architecture.

Generally, floating point exceptions are programmably enabled in a configuration/control register of the processor 10 (not shown). Most programs which use the floating point instructions do not enable floating point exceptions. Accordingly, the mechanisms described above may assume that floating point exceptions do not occur. Particularly, the graduation stage of the integer and load/store pipelines (at which time updates to the architected state of the processor, including writes to the register file 28, become committed and cannot be recovered) is in clock cycle 7 in FIG. 3. However, the register file write (Wr) stage for floating point instructions (at which exceptions may be detected) is in clock cycle 8 for the short floating point instructions. Accordingly, an integer instruction or a load/store instruction which is subsequent to a short floating point instruction in program order but is co-issued with the short floating point instruction may commit an update prior to the detection of the exception for the short floating point instruction. The register file write (Wr) stage for the floating point multiply-add and long latency floating point instructions is even later, which may allow instructions which are issued in clock cycle after the issuance of the multiply-add or long latency instruction to commit updates. Additionally, co-issuance of short floating point instructions subsequent to the multiply-add or long latency floating point instructions may allow for updates to be committed prior to the signaling of an exception.

If floating point exceptions are not enabled, the above operation does not present any issues. If floating point exceptions are enabled, the above operation could allow an instruction subsequent to a floating point instruction in program order to commit an update even if the floating point instruction experiences an exception. To support precise exceptions, one embodiment of the issue control circuit 42 may support additional issue constraints if floating point exceptions are enabled. Particularly, if a floating point instruction is selected for issue in a given clock cycle, the issue control circuit 42 may inhibit the co-issuance of any subsequent integer instructions or load/store instructions, in program order, with the floating point instruction. Thus, any co-issued integer instructions or load/store instructions are prior to the floating point instruction and graduation of these instructions before the floating point instruction results in correct exception handling. Similarly, if a multiply-add or long latency floating point instruction is selected for issue, co-issue of subsequent floating point instructions is inhibited.

The inhibiting of instruction issue may be applied in any fashion. For example, the circuitry for selecting each instruction for issue may integrate the above constraints (conditional based on whether or not floating point exceptions are enabled). Alternatively, the issue control circuit 42 may preselect instructions for issue without regard to the issue constraints implemented when floating point exceptions are enabled. The preselected group of instructions may be scanned, and any inhibited instructions may be detected and prevented from issuing.

Additionally, the issue control circuit 42 may prevent subsequent issue of instructions until it is known that the issued floating point instructions will report exceptions, if any, prior to any subsequently issued instructions committing an update (e.g. passing the graduation stage). In one embodiment, the FP Madd RAW issue scoreboard 46E may be used for this purpose. Since the FP Madd RAW issue scoreboard 46E bits are cleared 9 clock cycles before the corresponding floating point instruction reaches the register file write (Wr) stage (and reports an exception), a subsequent instruction may be issued 8 clock cycles before the corresponding floating point instruction reaches the register file write (Wr) stage. For floating point instructions, to ensure the Wr/graduation stage is after the corresponding floating point instruction's Wr stage, the result of the OR may be delayed by one clock cycle and then used to allow issue of the floating point instructions to occur (e.g. the subsequent floating point instructions may issue 7 clock cycles prior to the corresponding floating point instruction reaching the register file write stage, in the embodiment of FIG. 3). For integer instructions and load/store instructions (which graduate one clock cycle earlier than floating point instructions in the present embodiment) the result of the OR may be delayed by two clock cycles and then used to allow issue of the integer and load/store instructions. Accordingly, the issued instructions may be canceled prior to committing their updates if an exception is detected. In other embodiments, subsequent instruction issue may be delayed using other mechanisms. For example, an embodiment may delay until the floating point instruction actually reaches the Wr stage and reports exception status, if desired.

It is noted that, while the integer and load/store pipelines commit their updates at the graduation stage, these pipelines write the register file 28 prior to the graduation stage (e.g. at clock cycle 4 in FIG. 3 for the load/store pipelines and at clock cycle 5 in FIG. 3 for the integer pipelines). The processor 10 may maintain a history stack of prior register states between clock cycles 4/5 and 7 for recovering the register file 28 in the event of an exception. Alternatively, a future file or any other speculative structure may be used to allow the updates and recovering from the updates if an exception is detected.

Figure 21:
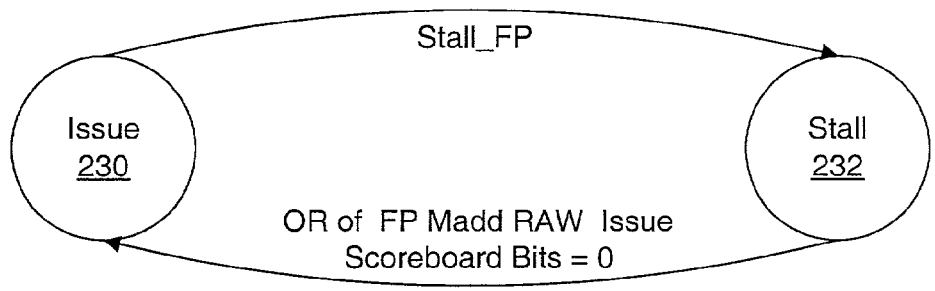
FIG. 21 is a state machine diagram illustrating one embodiment of issue operation in a pipeline in which floating point instructions graduate later than integer operations.

Turning now to FIG. 21, a state machine diagram is shown illustrating a state machine that may be employed by one embodiment of the issue control circuit 42 for handling floating point exceptions. Other embodiments are possible and contemplated. In the embodiment of FIG. 21, the state machine includes an issue state 230 and a stall state 232.

In the issue state 230, the issue control circuit 42 may apply various issue constraints to the instructions in the issue queue 40 which have not been issued, and may select instructions for issue which meet the issue constraints. Additionally, the issue constraints used if floating point exceptions are enabled may be applied if floating point exceptions are enabled. For example, in one embodiment, the issue control circuit 42 may apply the issue constraints illustrated in FIGS. 8 and 13 to instructions (and optionally the floating point exceptions enabled constraints) while in the issue state 42. In the stall state 232, the issue control circuit 42 may inhibit any instruction issue.

Figure 22:
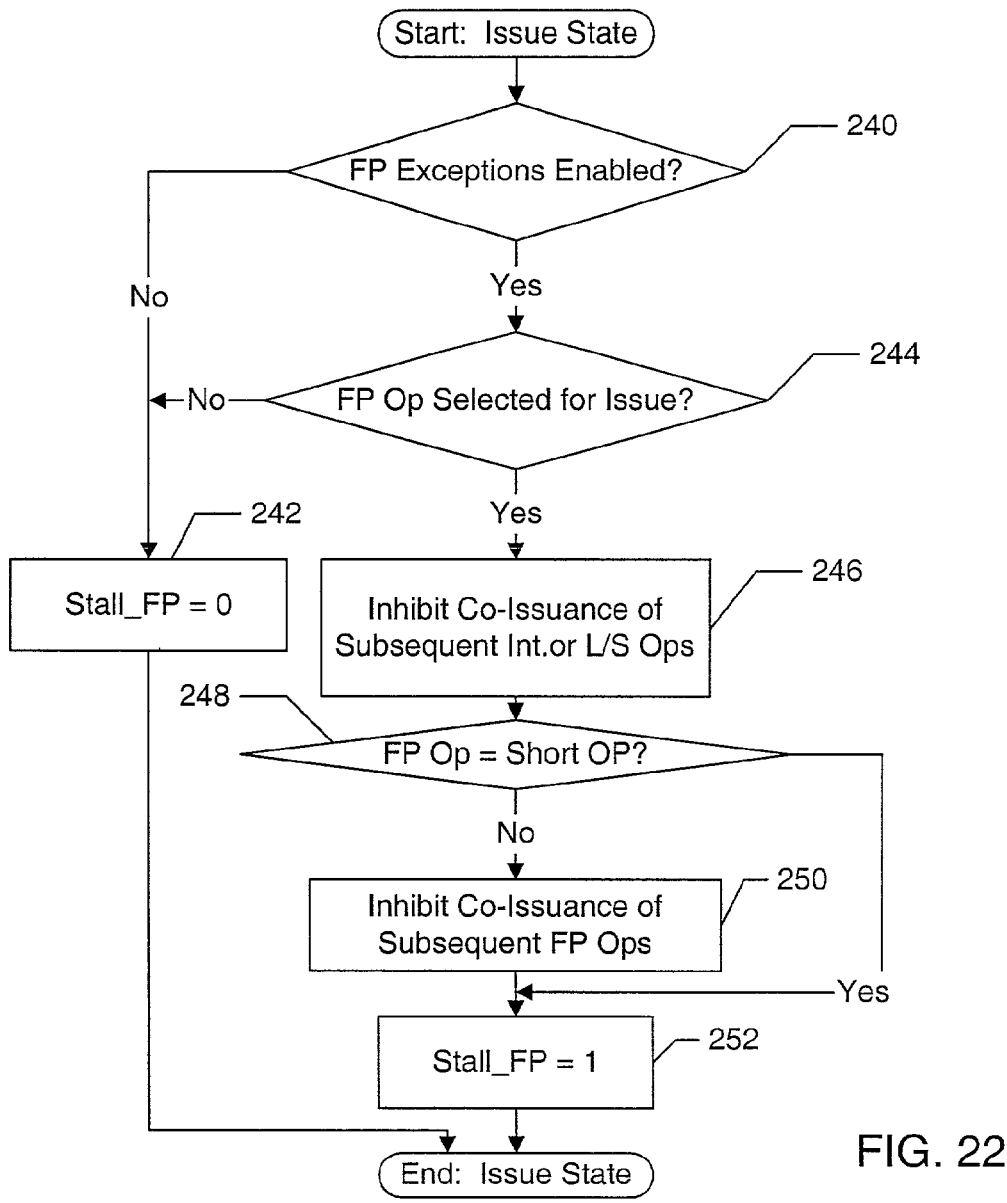
FIG. 22 is a flowchart illustrating additional issue constraints which may be used in one embodiment of the processor 10.

The issue control circuit 42 may remain in the issue state 230 unless a stall due to floating point instruction issue is detected (Stall_FP=1). The flowchart in FIG. 22 illustrates the generation of the Stall_FP indication. Responsive to the Stall_FP indication being asserted, the issue control circuit 42 transitions to the stall state 232 and inhibits instruction issue. The issue control circuit 42 may remain in the stall state 232 until the OR of the bits in the FP Madd RAW issue scoreboard 46E is equal to zero (i.e. until the FP Madd RAW issue scoreboard 46E is not tracking dependencies for any floating point instructions). The issue control circuit 42 may transition from the stall state 232 to the issue state 230 in response to the OR of the FP Madd RAW issue scoreboard 46E bits equaling zero.

As mentioned above, in the present embodiment the OR result may be delayed by one clock cycle for allowing the issue of floating point instructions and for two clock cycles for allowing issue of integer and load/store instructions. Accordingly, the transition to the issue state 230 from the stall state 232 may be followed by one or two clock cycles of delay in this embodiment. Alternatively, separate state machines may be used for integer and load/store instructions and for floating point instructions, with the transition to the issue state delayed appropriately for each type of instruction. In other embodiments, all instruction issue may be restarted at the same time for simplicity (e.g. after two clock cycles of delay, for the pipelines illustrated in FIG. 3). Furthermore, in other embodiments, scoreboards may be included for use when floating point exceptions are enabled.

Turning now to FIG. 22, a flowchart is shown representing operation of one embodiment of circuitry in the issue control circuit 42 for issuing instructions if floating point exceptions are enabled. Other embodiments are possible and contemplated. The issue constraints illustrated in FIG. 22 may be the issue constraints used when floating point exceptions are enabled. Other issue constraints (e.g. FIG. 8 and FIG. 13) may also be applied. While the blocks shown in FIG. 22 are illustrated in a particular order for ease of understanding, any order may be used. Furthermore, some blocks may represent independent circuitry operating in parallel with other circuitry.

If floating point exceptions are not enabled (decision block 240), the issue control circuit 42 generates the Stall_FP indication equal to zero (block 242) and imposes no issue constraints related to floating point exceptions being enabled. The "no" leg of decision block 240 and block 242 may thus represent operation when floating point exceptions are not enabled, and transitions to the stall state 232 do not occur.

If floating point exceptions are enabled (decision block 240), but no floating point instructions are selected for issue (decision block 244), the issue control circuit 42 generates the Stall_FP indication equal to zero (block 242) and issues the selected instructions. On the other hand, if a floating point instruction is selected for issue, the issue control circuit 42 inhibits the co-issuance of subsequent integer instructions or load/store instructions (in program order) (block 246). Additionally, if any floating point instruction selected for issue is not a short floating point instruction (decision block 248), the co-issuance of any subsequent floating point instructions to that floating point instruction (in program order) is inhibited (block 250). In either case, if a floating point instruction is issued, the Stall_FP indication is generated equal to one (block 252).

It is noted that, in another embodiment, stalling of instruction issue after the issuance of a floating point instruction may only be performed in the floating point instruction is not a short floating point instruction. Short floating point instructions, in one embodiment, reach the write stage in clock cycle 8 in FIG. 3. Thus, the short floating point instructions are cleared from the FP Madd RAW scoreboards immediately (or do not set bits in the FP Madd RAW scoreboard at all). Accordingly, stalling instruction issue after short floating point instruction issue may not be required, in some embodiments.

It is noted that instructions have been described herein as concurrently issued or co-issued. These terms are intended to be synonymous. A first instruction is concurrently issued or co-issued with a second instruction if the first instruction is issued in the same clock cycle as the second instruction.

Figure 23:
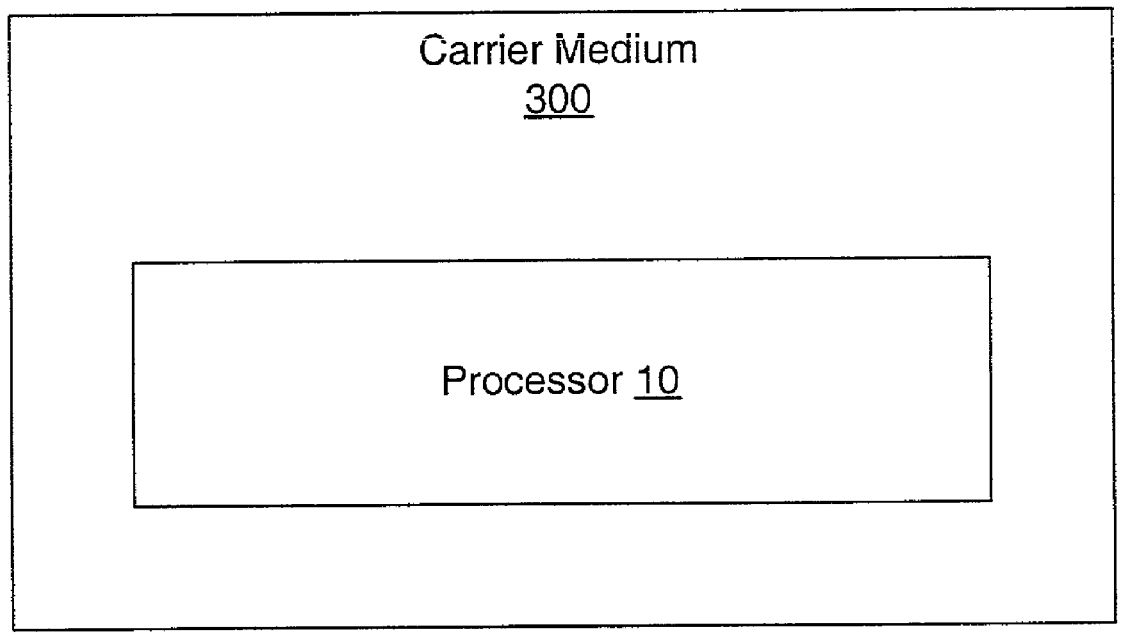
FIG. 23 is a block diagram of one embodiment of a carrier medium.

Turning next to FIG. 23, a block diagram of a carrier medium 300 including one or more data structures representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structure(s) of the processor 10 carried on carrier medium 300 may be read by a program and used, directly or indirectly, to fabricate the hardware comprising the processor 10. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the processor 10. The netlist(s) may then be placed and routed to produce one or more data set(s) describing geometric shapes to be applied to masks. The masks may then be used in various semiconductor fabrication steps to produce a semiconductor circuit or circuits corresponding to the processor 10. Alternatively, the data structure(s) on carrier medium 300 may be the netlist(s) (with or without the synthesis library) or the data set(s), as desired.

While carrier medium 300 carries a representation of the processor 10, other embodiments may carry a representation of any portion of processor 10, as desired, including a fetch/decode/issue unit 14, issue control circuit 42, scoreboards 44 and/or 46, issue queue 40, read queue 210, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   an integer pipeline to process integer instructions;
   a floating point pipeline to process short latency and long latency floating point instructions in which both short and long latency floating point instructions generate exceptions, wherein the floating point pipeline has a greater number of pipeline stages to process floating point instructions than a number of pipeline stages to process integer instructions in the integer pipeline; and
   a control circuit coupled to the integer and floating point pipelines to inhibit co-issuance of an integer instruction to the integer pipeline when the integer instruction is subsequent to a first floating-point instruction in program order, until the first floating point-instruction reaches a stage in the floating-point pipeline where exceptions are to be generated to ensure that the integer instruction does not graduate from the integer pipeline prior to exception determination for the first floating point instruction in the floating-point pipeline, the control circuit to also inhibit co-issuance of a second floating-point instruction that follows the first floating-point instruction in program order, if the first floating-point instruction is a long latency floating-point instruction, to ensure that the second floating-point instruction does not graduate prior to the exception determination for the first floating point instruction, but not to inhibit the second floating-point instruction from co-issuance if the first floating-point instruction is a short latency floating-point instruction, since the second floating-point instruction will not graduate prior to the exception determination for the first floating-point instruction.

2. The apparatus of claim 1 wherein the first floating-point instruction is a multiply-add instruction that is one of the lone latency floating point instructions.

3. The apparatus of claim 1 further comprising a load/store pipeline coupled to the control circuit to process load and store instructions, the load/store pipeline also to be inhibited for co-issuance of load or store instruction, which is subsequent to the first floating-point instruction in program order, until the first floating-point instruction reaches the stage in the floating-point pipeline where exceptions are to be generated.

4. A method comprising:
   queuing a first floating-point instruction for issuance to a floating-point pipeline to process the first floating-point instruction, wherein the first floating point instruction is either a short latency floating point instruction or a long latency floating point instruction, in which both the short and long latency floating point instructions generate exceptions;
   determining if exception handling for floating-point instructions is enabled;
   inhibiting co-issuance of an integer instruction to an integer pipeline when the integer instruction is subsequent to the first floating-point instruction in program order and the exception handling is enabled, until the first floating point-instruction reaches a stage in the floating-point pipeline where exceptions are to be generated to ensure that the integer instruction does not graduate from the integer pipeline prior to exception determination for the first floating point instruction in the floating-point pipeline;
   determining if the first floating-point instruction is the short latency floating-point instruction or the long latency floating point instruction;
   inhibiting co-issuance of a second floating-point instruction that follows the first floating-point instruction in program order and the exception handling is enabled, if the first floating-point instruction is the long latency floating-point instruction, to ensure that the second floating-point instruction does not graduate prior to the exception determination for the first floating point instruction, but not to inhibit the second floating-point instruction from co-issuance if the first floating-point instruction is the short latency floating-point instruction, since the second floating-point instruction will not graduate prior to the exception determination for the first floating-point instruction.

5. The method of claim 4 wherein the long latency floating-point instruction is a multiply-add instruction.

6. The method of claim 4 further comprising inhibiting co-issuance of a load or store instruction to a load/store pipeline when the load or store instruction is subsequent to the first floating-point instruction in program order and the exception handling is enabled, until the first floating point-instruction reaches the exception determination stage in the floating-point pipeline.

* * * * *